(12) United States Patent (10) Patent No.: US 8,301,501 B1
Glaeser et al. (45) Date of Patent: Oct. 30, 2012

(54) METHOD AND SYSTEM FOR INFORMING A USER OF THE EFFECT OF A HYPOTHETICAL PURCHASE ON THE USER'S FINANCES AT THE POINT OF SALE

(75) Inventors: Justin Glaeser, Sunnyvale, CA (US); Aaron Elias Berhanu, San Francisco, CA (US); Simon Levy, Sunnyvale, CA (US); Ummulkiram Mohammed Dahodwala, Boston, MA (US)

(73) Assignee: Intuit Inc., Mountain View, CA (US)

( * ) Notice: Subject to any disclaimer, the term of this patent is extended or adjusted under 35 U.S.C. 154(b) by 309 days.

(21) Appl. No.: 12/646,845

(22) Filed: Dec. 23, 2009

(51) Int. Cl.
*G06Q 20/00* (2012.01)
*G06F 15/16* (2006.01)
(52) U.S. Cl. .......................... 705/17; 709/246
(58) Field of Classification Search ....................... 705/17
See application file for complete search history.

(56) References Cited

U.S. PATENT DOCUMENTS 6,886,046 B2 * 4/2005 Stutz et al. .................... 709/246
7,707,093 B2 * 4/2010 O'Shaughnessy et al. . 705/36 R
7,941,350 B2 * 5/2011 Ginsburg et al. ............... 705/29

OTHER PUBLICATIONS

"Point of Sale Merchandising", Paul Bubny Army/Navy Store & Outdoor Merchandiser; Feb. 15, 2008; 63, 2; ABI/INFORM Trade & Industry p. 54.*

\* cited by examiner

*Primary Examiner* — Garcia Ade
(74) *Attorney, Agent, or Firm* — McKay and Hodgson, LLP; Philip McKay; Sean P. Lewis

(57) ABSTRACT

A method and system for displaying to a user the effect of a hypothetical purchase on the user's budgetary goals whereby a given product and/or service being considered for purchase and/or the cost of the given product and/or service being considered is identified and a product/service category database is searched to find a financial category associated with the given product and/or service. Financial budget/goal data indicating the given user's one or more budgetary and/or financial goals for a financial category associated with the given product and/or service for the given period of time, the current financial data indicating the given user's actual spending in the financial category associated with the given product and/or service for the given period of time, and the data indicating the cost of the given product and/or service being considered for purchase is analyzed to present the user data indicating the hypothetical remaining balance for the financial category associated with the given product and/or service for the given period of time that would result if the given product and/or service were actually purchased.

40 Claims, 6 Drawing Sheets

METHOD AND SYSTEM FOR INFORMING A USER OF THE EFFECT OF A HYPOTHETICAL PURCHASE ON THE USER'S FINANCES AT THE POINT OF SALE

BACKGROUND

For most individuals monitoring, the state of their finances and tracking their expenditures is an extremely important and fundamental responsibility. Unfortunately, due to a lack of time, limits of currently available resources, and in some instances, a lack of motivation, many individuals have historically failed to recognize and accept this responsibility. However, recent economic events have reminded many individuals of the urgent need to determine, and monitor, the state of their finances, as well as identify realistic financial goals, formulate plans of action to meet those financial goals, and monitor progress towards financial goals.

Several computing system implemented financial management systems are currently available to help a user, or an authorized individual on behalf of a user, gather a user's financial data and/or process/analyze that user's own financial data into various budgets and/or reports based on various parameters that are commonly provided/defined by the user. Typically, these currently available computing system implemented financial management systems provide a user with financial data such as, but not limited to, the user's overall financial worth data, the user's income data, the user's expense data, and the user's transactional data. In addition, currently available computing system implemented financial management systems often allow a user to set spending limits/goals, or budgets, for various financial categories for defined periods of time, such as a month, and to identify unallocated or "discretionary" funds. However, currently, computing system implemented financial management systems typically present the user with budgeting analysis, and/or reports in the form of largely resultant data based on historical events. As a result, currently available computing system implemented financial management systems typically offer only time delayed and post event summaries of financial activity after the fact, i.e., after the transactional choices have already been made by the user.

While the time-delayed "reactive" monitoring of financial goals and budget analysis currently provided by computing system implemented financial management systems has several uses, it fails to provide the user with real-time monitoring and budgeting data at the time the user is contemplating a purchase or to provide a user with an indication of how a given potential purchase might actually impact the user's budgetary goals. Therefore, the time-delayed "reactive" monitoring of financial goals and budget analysis currently available often does little to help the user/consumer determine the effect of a given potential purchase on the user's financial goals or to help the user make an informed decision as to whether or not to make a given contemplated purchase.

SUMMARY

In accordance with one embodiment, a method and system for displaying to a user the effect of a hypothetical purchase on the user's budgetary goals includes a process for displaying to a user the effect of a hypothetical purchase on the user's budgetary goals whereby, in one embodiment, a given user defines one or more budgetary and/or financial goals for one or more financial categories for a given period of time. In one embodiment, a product/service category database is created that associates one or more products and/or services with one or more financial categories. In one embodiment, when a user is contemplating the purchase of a given product and/or service, data indicating the given product and/or service being considered for purchase, and/or the cost of the given product and/or service being considered for purchase, is obtained via one or more means as discussed herein, and/or as known in the art at the time of filing, and/or as developed after the time of filing. In one embodiment, once the given product and/or service being considered, and/or the cost of the given product and/or service being considered, is identified, the product/service category database is searched to find a financial category associated with the given product and/or service. In one embodiment, the financial budget/goal data indicating the given user's budgetary and/or financial goals for the financial category associated with the given product and/or service for the given period of time is then obtained. In one embodiment, current financial data indicating the given user's actual spending in the financial category associated with the given product and/or service for the given period of time is also obtained. In one embodiment, the financial budget/goal data indicating the given user's budgetary and/or financial goals for the financial category associated with the given product and/or service for the given period of time, the current financial data indicating the given user's actual spending in the financial category associated with the given product and/or service for the given period of time, and the data indicating the cost of the given product and/or service being considered for purchase is analyzed/compared. In one embodiment, the user is then presented data indicating the hypothetical remaining balance for the financial category associated with the product and/or service for the given period of time that would result if the given product and/or service were actually purchased. In one embodiment, the hypothetical remaining balance data for the financial category associated with the product and/or service for the given period of time is then displayed to the user, at least in part, as a visual/graphical display.

Herein, the term financial category includes any grouping of financial activities defined by one or more users, and/or one or more computing system implemented data management systems, and/or a process for displaying to a user the effect of a hypothetical purchase on the user's budgetary goals. As an example, the term financial category can include, but is not limited to: rent/mortgage; entertainment; dinning out; food; groceries; car/transportation; clothing; school supplies/tuition; business; personal; savings; goal oriented savings; discretionary funds; vacation; and/or any other grouping of financial activities and/or financial transactions as discussed herein, and/or as known in the art at the time of filing, and/or as developed after the time of filing.

In accordance with one embodiment, the given user defines one or more budgetary and/or financial goals for one or more financial categories for a given period of time using, and/or through, a computing system implemented data management system such as, but not limited to, a computing system implemented personal financial management system.

As used herein, the term "computing system implemented data management system" includes, but is not limited to: computing system implemented, and/or web-based, financial management systems, packages, programs, modules, or applications; computing system implemented, and/or web-based, banking systems, packages, programs, modules, or applications; computing system implemented, and/or web-based, personal and small business financial management systems, packages, programs, modules, or applications; computing system implemented, and/or web-based, payroll systems, packages, programs, modules, or applications; computing system implemented, and/or web-based, accounting and/ or invoicing systems, packages, programs, modules, or applications; computing system implemented, and/or web-based, business systems, packages, programs, modules, or applications; computing system implemented, and/or web-based, marketing device distribution systems, packages, programs, modules, or applications; computing system implemented, and/or web-based, financial institution financial management systems, packages, programs, modules, or applications; computing system implemented, and/or web-based, tax preparation systems, packages, programs, modules, or applications; computing system implemented, and/or web-based, business and/or point of sale systems, packages, programs, modules, or applications; computing system implemented, and/or web-based, healthcare management systems, packages, programs, modules, or applications; computing system implemented, and/or web-based, social networking and/or communication systems, packages, programs, modules, or applications; and various other computing system implemented, and/or web-based, electronic data driven systems, packages, programs, modules, or applications, whether known at the time of filing or as developed later.

As used herein, the term "computing system implemented financial management system" includes, but is not limited to: any computing system implemented, and/or web-based, data management system, package, program, module, or application that gathers financial data, including financial transactional data and/or has the capability to analyze and categorize at least part of the financial data. Herein, a computing system implemented financial management system can be, but is not limited to, any of the following: a computing system implemented personal and/or business financial management system, package, program, module, or application; a computing system implemented home and/or business inventory system, package, program, module, or application; a computing system implemented personal and/or business asset management system, package, program, module, or application; a computing system implemented personal and/or business accounting system, package, program, module, or application; a computing system implemented personal and/or business tax preparation system, package, program, module, or application; a computing system implemented healthcare cost management system, package, program, module, or application; and/or any of the numerous computing system implemented financial management systems discussed herein, and/or known to those of skill in the art at the time of filing, and/or as developed after the time of filing.

Specific examples of computing system implemented financial management systems include, but are not limited to: Quicken™, available from Intuit Inc. of Mountain View, Calif.; Quicken Online™, available from Intuit Inc. of Mountain View, Calif.; QuickEooks™, available from Intuit Inc. of Mountain View, Calif.; Quicken Health Expense Manager™, available from Intuit Inc. of Mountain View, Calif.; Mint.com™, available from Intuit Inc. of Mountain View, Calif.; Microsoft Money™, available from Microsoft, Inc. of Redmond, Wash.; and/or various other computing system implemented financial management systems discussed herein, and/or known to those of skill in the art at the time of filing, and/or as developed after the time of filing.

In various embodiments, the given user defines one or more budgetary and/or financial goals for one or more financial categories for a given period of time through, and/or the computing system implemented data management system is implemented on, one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

Herein, the term "computing system", includes, but is not limited to: a portable computer; a desktop computer; a notebook computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; internet appliances; or any desired combination of devices, as discussed herein, and/or as known in the art at the time of filing, and/or as developed after the time of filing, that are coupled to perform the processes and/or operations as described herein.

In one embodiment, financial budget/goal data indicating the given user's one or more budgetary and/or financial goals for the one or more financial categories for the given period of time is associated with the given user, and the respective financial categories, and is then stored in whole, or in part, in any memory and/or database maintained by, accessible by, owned by, or otherwise related to, but not limited to, one or more of the following: a provider of the process for displaying to a user the effect of a hypothetical purchase on the user's budgetary goals; a provider of a computing system implemented data management system; one or more users; or any third party by any one of the numerous mechanisms known to those of skill in the art at the time of filing, and/or as developed after the time of filing.

For instance, in various embodiments, the data, in whole, or in part, is stored in a memory system, or server memory system, or database, or in a cache memory, or in any main memory or mass memory, associated with a user computing system and/or another computing system and/or a dedicated database. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

In one embodiment, the product/service category database that associates one or more products and/or services with one or more financial categories is implemented on, and/or created using, one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, the product/service category database is created, at least in part, using data provided by one or more users. In one embodiment, the product/service category database is created, at least in part, using data provided by one or more computing system implemented data management systems. In one embodiment, the product/service category database is created, at least in part, using data provided by one or more computing system implemented data management systems and/or one or more user's historical categorizations of transactions involving the one or more products and/or services. In one embodiment, the product/service category database is created, at least in part, using data provided by one or more computing system implemented data management systems and/or the given user's historical categorizations of transactions involving the one or more products and/or services. In one embodiment, the product/service category database is created, at least in part, using data from the one or more providers of products and/or services. In one embodiment, the product/service category database is created, at least in part, using screen scraping technology and/or data mining techniques. In one embodiment, the product/service category database is created, at least in part, using data from any source of data that associates one or more products and/or services with one or more financial categories as discussed herein, and/or as known in the art at the time of filing, and/or as developed after the time of filing.

In one embodiment, when the user contemplates a hypothetical purchase of the given product and/or service, the process for displaying to a user the effect of a hypothetical purchase on the user's budgetary goals is manually activated by the user via an icon, or other graphical display and/or activation interface, on a user interface screen of any user computing system as discussed herein, and/or as known in the art at the time of filing, and/or as developed after the time of filing.

In one embodiment, when the user contemplates a hypothetical purchase of the given product and/or service, the process for displaying to a user the effect of a hypothetical purchase on the user's budgetary goals is manually activated by the user via an icon, or other graphical display and/or activation interface, displayed in a web-browser graphic and/or frame/header.

In one embodiment, when the user contemplates a hypothetical purchase of the given product and/or service, the process for displaying to a user the effect of a hypothetical purchase on the user's budgetary goals is automatically activated.

In one embodiment, data indicating the cost of the given product and/or service the user is considering purchasing includes, but is not limited to, the purchase price of the given product and/or service, any tax associated with the purchase of the given product and/or service, any shipping and/or handling charges associated with the purchase of the given product and/or service, and/or any other charges/costs associated with the purchase of the given product and/or service.

In one embodiment, the user contemplates a hypothetical purchase of the given product and/or service by accessing a given user interface of a website through which the given product and/or service is offered and/or displayed. In one embodiment, the user accesses the given user interface of the website through which the given product and/or service is offered and/or displayed via any user computing system as discussed herein, and/or as known in the art at the time of filing, and/or as developed after the time of filing.

In one embodiment, the user accesses the given user interface of the website through which the given product and/or service is offered and/or displayed via one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, when the user accesses the given user interface of the website through which the given product and/or service is offered and/or displayed, and the process for displaying to a user the effect of a hypothetical purchase on the user's budgetary goals is activated, data indicating the given product and/or service the user is considering purchasing, and/or the cost of the given product and/or service the user is considering purchasing, is obtained by the process for displaying to a user the effect of a hypothetical purchase on the user's budgetary goals using screen scraping, or any similar technology, as discussed herein, and/or as known in the art at the time of filing, and/or as developed after the time of filing.

In various embodiments, the user contemplates a hypothetical purchase of the given product and/or service at a physical point of sale. In some embodiments, data indicating the given product and/or service the user is considering purchasing, and/or the cost of the given product and/or service the user is considering purchasing, is obtained by the process for displaying to a user the effect of a hypothetical purchase on the user's budgetary goals by scanning a bar code, or similar labeling system, associated with the given product and/or service the user is considering purchasing using any means and/or any computing system, as discussed herein, and/or as known in the art at the time of filing, and/or as developed after the time of filing.

In various embodiments, data indicating the given product and/or service the user is considering purchasing, and/or the cost of the given product and/or service the user is considering purchasing, is obtained by the process for displaying to a user the effect of a hypothetical purchase on the user's budgetary goals via Radio Frequency IDentification (RFID), or similar labeling system, associated with the given product and/or service the user is considering purchasing using any means and/or any computing system, as discussed herein, and/or as known in the art at the time of filing, and/or as developed after the time of filing.

In various embodiments, data indicating the given product and/or service the user is considering purchasing, and/or the cost of the given product and/or service the user is considering purchasing, is obtained by the process for displaying to a user the effect of a hypothetical purchase on the user's budgetary goals via data entry of a product name, a product number, serial number, part number, inventory number, or similar labeling system, and/or the purchase price, associated with the given product and/or service the user is considering purchasing using any means and/or any computing system, as discussed herein, and/or as known in the art at the time of filing, and/or as developed after the time of filing.

In various embodiments, data indicating the given product and/or service the user is considering purchasing, and/or the cost of the given product and/or service the user is considering purchasing, is obtained by the process for displaying to a user the effect of a hypothetical purchase on the user's budgetary goals via voice recognition software data entry of a product name, product number, serial number, part number, inventory number, or similar labeling system, and/or the purchase price, associated with the given product and/or service the user is considering purchasing using any means and/or any computing system, as discussed herein, and/or as known in the art at the time of filing, and/or as developed after the time of filing.

In various embodiments, data indicating the given product and/or service the user is considering purchasing, and/or the cost of the given product and/or service the user is considering purchasing, is obtained by the process for displaying to a user the effect of a hypothetical purchase on the user's budgetary goals via any means, mechanism, process, and/or procedure for identifying a product and/or service and cost as discussed herein, and/or as known in the art at the time of filing, and/or as developed after the time of filing.

In one embodiment, once the given product and/or service being considered is identified, the product/service category database is searched to find a financial category associated with the given product and/or service using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, once the one or more financial categories associated with the given product and/or service are identified, the financial budget/goal data indicating the given user's budgetary and/or financial goals for the financial category associated with the given product and/or service for the given period of time is obtained from the stored financial budget/goal data indicating the given user's one or more budgetary and/or financial goals for the one or more financial categories for the given period of time. In one embodiment, the financial budget/goal data is obtained using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, at least part of the current financial data indicating the given user's actual spending in the financial category associated with the given product and/or service for the given period of time is obtained from a computing system implemented data management system such as, but not limited to, a computing system implemented personal financial management system.

In one embodiment, at least part of the current financial data indicating the given user's actual spending in the financial category associated with the given product and/or service for the given period of time is provided to, and/or entered into, and/or transferred to, and/or downloaded to, and/or otherwise obtained by, the process for displaying to a user the effect of a hypothetical purchase on the user's budgetary goals and/or a computing system implemented data management system associated with the process for displaying to a user the effect of a hypothetical purchase on the user's budgetary goals from the user, one or more banks, one or more credit card companies, a credit reporting agency or bureau, and/or any other financial institution or data source via any network or network system, as discussed herein, and/or available or known at the time of filing, and/or as later developed.

In one embodiment, at least part of the current financial data indicating the given user's actual spending in the financial category associated with the given product and/or service for the given period of time is provided to, and/or entered into, and/or transferred to, and/or downloaded to, and/or otherwise obtained by, the process for displaying to a user the effect of a hypothetical purchase on the user's budgetary goals, and/or a computing system implemented data management system associated with the process for displaying to a user the effect of a hypothetical purchase on the user's budgetary goals, by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the financial budget/goal data indicating the given user's budgetary and/or financial goals for the financial category associated with the given product and/or service for the given period of time, the current financial data indicating the given user's actual spending in the financial category associated with the given product and/or service for the given period of time, and the data indicating the cost of the given product and/or service the user is considering purchasing is analyzed/compared using, or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, a hypothetical remaining balance for the financial category associated with the product and/or service for the given period of time that would result if the given product and/or service were actually purchased is determined under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, the user is then presented data indicating the hypothetical remaining balance for the financial category associated with the product and/or service for the given period of time that would result if the given product and/or service were actually purchased using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, the user is presented data indicating the hypothetical remaining balance for the financial category associated with the product and/or service for the given period of time that would result if the given product and/or service were actually purchased on a display screen of a display device of any computing system, as defined herein, and/or as known in the art at the time of filing, and/or as developed after the time of filing.

In one embodiment, the user is presented data indicating the hypothetical remaining balance for the financial category associated with the product and/or service for the given period of time that would result if the given product and/or service were actually purchased in the same display screen displaying the user interface of the website through which the given product and/or service is offered and/or displayed and from which the process for displaying to a user the effect of a hypothetical purchase on the user's budgetary goals obtained the data indicating the given product and/or service the user is considering purchasing, and/or the cost of the given product and/or service the user is considering purchasing.

In one embodiment, the hypothetical remaining balance data for the financial category associated with the product and/or service for the given period of time is displayed to the user, at least in part, as a visual/graphical display. For instance, in various embodiments, the hypothetical remaining balance data for the financial category associated with the product and/or service for the given period of time is displayed to the user in the form of any table, symbol, or graphical display. As an example, a table, a ledger, a thermometer, a sliding scale, any graphical representation, or any partially filled figure or symbol, or outline thereof, may be used. Moreover, these symbols, graphical displays, and scales may, in some embodiments, display the user's used funds, and/or unused funds, and/or the differential between the user's current spending and the identified financial goals.

As a specific illustrative example, assume, in one embodiment, a given user defines one or more budgetary and/or financial goals for one or more financial categories for a given period of time such that the financial category of "discretionary spending" is allotted $100.00 for the month of January. In this specific example, further assume that, in January, the given user has already spent $52.00 in the financial category of discretionary spending. In this specific example, further assume a product/service category database is created that associates "blue jeans" with the financial category of discretionary spending. In this specific example, further assume the given user accesses a website associated with the given product and/or service "ONLINE SHOPPING NETWORK" and the given user accesses an interface display showing a pair of blue jeans being considered for purchase at a purchase price of $20.00, with tax of $5.00, and shipping and handling charge of $3.00.

In this specific example, using one embodiment of the process for displaying to a user the effect of a hypothetical purchase on the user's budgetary goals disclosed herein, once the process for displaying to a user the effect of a hypothetical purchase on the user's budgetary goals is activated, data indicating that the given product and/or service being considered for purchase is blue jeans is obtained, and/or the total cost of the blue jeans of $28.00 (purchase price of $20.00 plus the tax of $5.00 and the shipping and handling charge of $3.00) is obtained, in one example, using screen scrapping of the interface display showing the pair of blue jeans and/or the Uniform Resource Locator (URL) of one or more website interfaces displaying the blue jeans. In this specific example, in one embodiment, once the given product and/or service being considered for purchase is identified as blue jeans, the product/service category database is searched to find the financial category of "discretionary spending" that is associated with blue jeans.

In this specific example, in one embodiment, the financial budget/goal data indicating the given user's budgetary goal of $100.00 for the financial category of discretionary spending for the given period of January is then obtained. In this specific example, in one embodiment, current financial data indicating the given user's actual spending in the financial category of discretionary spending, specifically, data indicating the spending discussed above of $52.00 in the financial category of discretionary spending, for January thus far is also obtained.

Then, in this specific example, in one embodiment, using one or more processors, the $52.00 already spent in the category discretionary spending in January is subtracted from the $100.00 budgeted and it is determined that $48.00 remains for January. Then, the $28.00 cost of the blue jeans is subtracted from the remaining $48.00 for January to yield a hypothetical remaining balance for the financial category of discretionary spending of $20.00 for the remainder of January that would result if the blue jeans were actually purchased.

Continuing with this specific illustrative example, the hypothetical remaining balance data for the financial category of discretionary spending of $20.00 for the remainder of January is then displayed to the given user in the same display screen as the interface display showing the pair of blue jeans being considered for purchase, before the purchase is actually made. In one example, the hypothetical remaining balance data for the financial category of discretionary spending of $20.00 for the remainder of January is displayed, at least in part, as a visual and/or graphical display.

Using the method and system for displaying to a user the effect of a hypothetical purchase on the user's budgetary goals disclosed herein, a connection is established between a product and/or service currently being considered for purchase by a given user, financial categories associated with the product and/or service currently being considered for purchase by a given user, user budgets associated with those financial categories, and actual user spending in those financial categories for a defined period of time thus far. Then, using one embodiment of the method and system for displaying to a user the effect of a hypothetical purchase on the user's budgetary goals disclosed herein, these connections are leveraged to provide the user with a "real-time" display indicating to the given user what funds would remain in the financial category associated with the product and/or service currently being considered for purchase by a given user if the hypothetical purchase were actually completed. Consequently, using the method and system for displaying to a user the effect of a hypothetical purchase on the user's budgetary goals disclosed herein, a given user can observe the effects of a hypothetical purchase on their relevant categorized budget at, or before, the time of purchase, i.e., in "real-time" to make better spending decisions based on the real-time information. In one embodiment, this information is made available to the user in response to a single user activation action, such as a single mouse click, or, in other embodiments, automatically. Therefore, using the method and system for displaying to a user the effect of a hypothetical purchase on the user's budgetary goals disclosed herein, the given user is provided a simple and efficient mechanism to obtain the information necessary to stay within budget, achieve financial goals, avoid overdrafts, and generally monitor their financial position before making a purchase.

As discussed in more detail below, using the below embodiments, with little or no modification and/or user input, there is considerable flexibility, adaptability, and opportunity for customization to meet the specific needs of various users under numerous circumstances.

Figure 1:
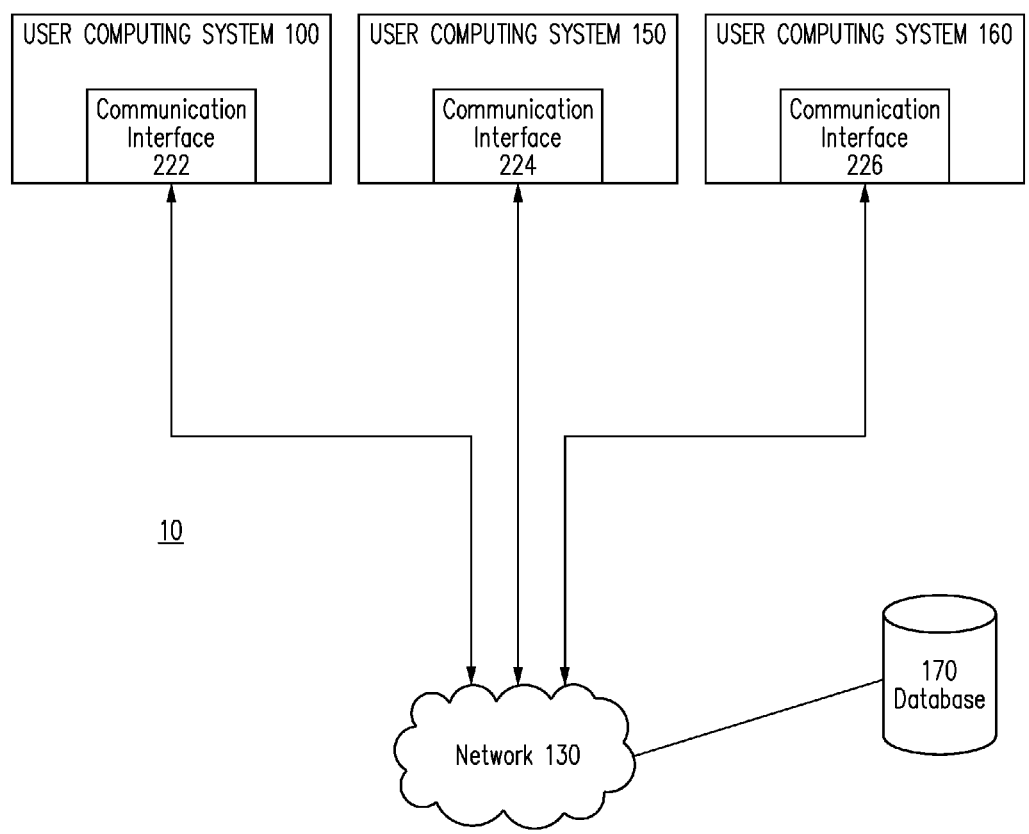
FIG. 1 is a block diagram of an exemplary hardware architecture for implementing one embodiment including a user computing system, a communication network, a database, and computing systems, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In accordance with one embodiment, a method and system for displaying to a user the effect of a hypothetical purchase on the user's budgetary goals includes a process for displaying to a user the effect of a hypothetical purchase on the user's budgetary goals whereby, in one embodiment, a given user defines one or more budgetary and/or financial goals for one or more financial categories for a given period of time. In one embodiment, a product/service category database is created that associates one or more products and/or services with one or more financial categories. In one embodiment, when a user is contemplating the purchase of a given product and/or service, data indicating the given product and/or service being considered for purchase, and/or the cost of the given product and/or service being considered for purchase, is obtained via one or more means as discussed herein, and/or as known in the art at the time of filing, and/or as developed after the time of filing. In one embodiment, once the given product and/or service being considered, and/or the cost of the given product and/or service being considered, is identified, the product/service category database is searched to find a financial category associated with the given product and/or service. In one embodiment, the financial budget/goal data indicating the given user's budgetary and/or financial goals for the financial category associated with the given product and/or service for the given period of time is then obtained. In one embodiment, current financial data indicating the given user's actual spending in the financial category associated with the given product and/or service for the given period of time is also obtained. In one embodiment, the financial budget/goal data indicating the given user's budgetary and/or financial goals for the financial category associated with the given product and/or service for the given period of time, the current financial data indicating the given user's actual spending in the financial category associated with the given product and/or service for the given period of time, and the data indicating the cost of the given product and/or service being considered for purchase is analyzed/compared. In one embodiment, the user is then presented data indicating the hypothetical remaining balance for the financial category associated with the product and/or service for the given period of time that would result if the given product and/or service were actually purchased. In one embodiment, the hypothetical remaining balance data for the financial category associated with the product and/or service for the given period of time is displayed to the user, at least in part, as a visual/graphical display.

FIG. 1 shows a block diagram of an exemplary hardware system 10 suitable for implementing one embodiment of a process for displaying to a user the effect of a hypothetical purchase on the user's budgetary goals, such as exemplary process 500 of FIG. 5 discussed below. Returning to FIG. 1, exemplary hardware system 10 includes: one or more user computing system(s) 100, including communication interface 222; computing system 150, including communication interface 224; computing system 160, including communication interface 226; and database 170; all communicating via communication interfaces 222, 224, 226, and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as computing systems 150 and/or 160 (discussed below) or any one or more of other user computing system(s) 100.

As used herein, the term "computing system", such as is included in the terms "user computing system" and "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; Internet appliance; or any desired combination of these devices, that are coupled to perform the processes and/or operations as described herein.

In various embodiments, user computing system(s) 100 can be any computing system as defined herein, and/or as known in the art at the time of filing, and/or as developed thereafter, that includes components that can execute all, or part, of a process for displaying to a user the effect of a hypothetical purchase on the user's budgetary goals in accordance with at least one of the embodiments as described herein. A more detailed discussion of user computing system(s) 100 is provided below with respect to FIG. 2.

Returning to FIG. 1, in one embodiment, computing system 150 is any computing system as defined herein and/or as known in the art at the time of filing, and/or as developed thereafter, that includes components that can execute all, or part, of a process for displaying to a user the effect of a hypothetical purchase on the user's budgetary goals in accordance with at least one of the embodiments as described herein. In one embodiment, computing system 150 is associated with any, but not limited to, one or more of the following: a provider of the process for displaying to a user the effect of a hypothetical purchase on the user's budgetary goals; a provider of a given computing system implemented data management system; one or more users; or any third party.

In one embodiment, computing system 150 is representative of two or more computing systems. In one embodiment, computing system 150 is a client computing system associated with one or more server computing systems. In one embodiment, computing system 150 is a server computing system that is, in turn, associated with one or more client computing systems. In one embodiment, computing system 150 is part of a cloud computing environment. A more detailed discussion of computing system 150 is provided below with respect to FIG. 3.

Returning to FIG. 1, in one embodiment, computing system 160 is any computing system as defined herein and/or as known in the art at the time of filing and/or as developed thereafter, that includes components that can execute all, or part, of a process for displaying to a user the effect of a hypothetical purchase on the user's budgetary goals in accordance with at least one of the embodiments as described herein. In one embodiment, computing system 160 is associated with any, but not limited to, one or more of the following: a provider of the process for displaying to a user the effect of a hypothetical purchase on the user's budgetary goals; a provider of a given computing system implemented data management system; one or more users; or any third party.

In one embodiment, computing system 160 is representative of two or more computing systems. In one embodiment, computing system 160 is a client computing system associated with one or more server computing systems. In one embodiment, computing system 160 is a server computing system that is, in turn, associated with one or more client computing systems. In one embodiment, computing system 160 is part of a cloud computing environment. A more detailed discussion of computing system 160 is provided below with respect to FIG. 4.

Also shown in FIG. 1 is database 170. In one embodiment, database 170 is a data storage device, a designated server system or computing system, or a designated portion of one or more server systems or computing systems, such as computing system(s) 100 and/or computing system 150 and/or computing system 160, or a distributed database, or an external and/or portable hard drive. In one embodiment, database 170 is a dedicated mass storage device implemented in software, hardware, or a combination of hardware and software. In one embodiment, database 170 is a product/service category database including data associating one or more products and/or services with one or more financial categories. In one embodiment, database 170 is a web-based function. As discussed in more detail below, in one embodiment, database 170 is under the control of, or otherwise accessible by, a process for displaying to a user the effect of a hypothetical purchase on the user's budgetary goals, and/or a provider of a computing system 150, and/or a provider of a computing system 160. In one embodiment, database 170 is part of a cloud computing environment.

In one embodiment, computing system(s) 100, computing system 150, computing system 160, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, computing system 150, computing system 160, and database 170, are coupled in a cloud computing environment.

Figure 2:
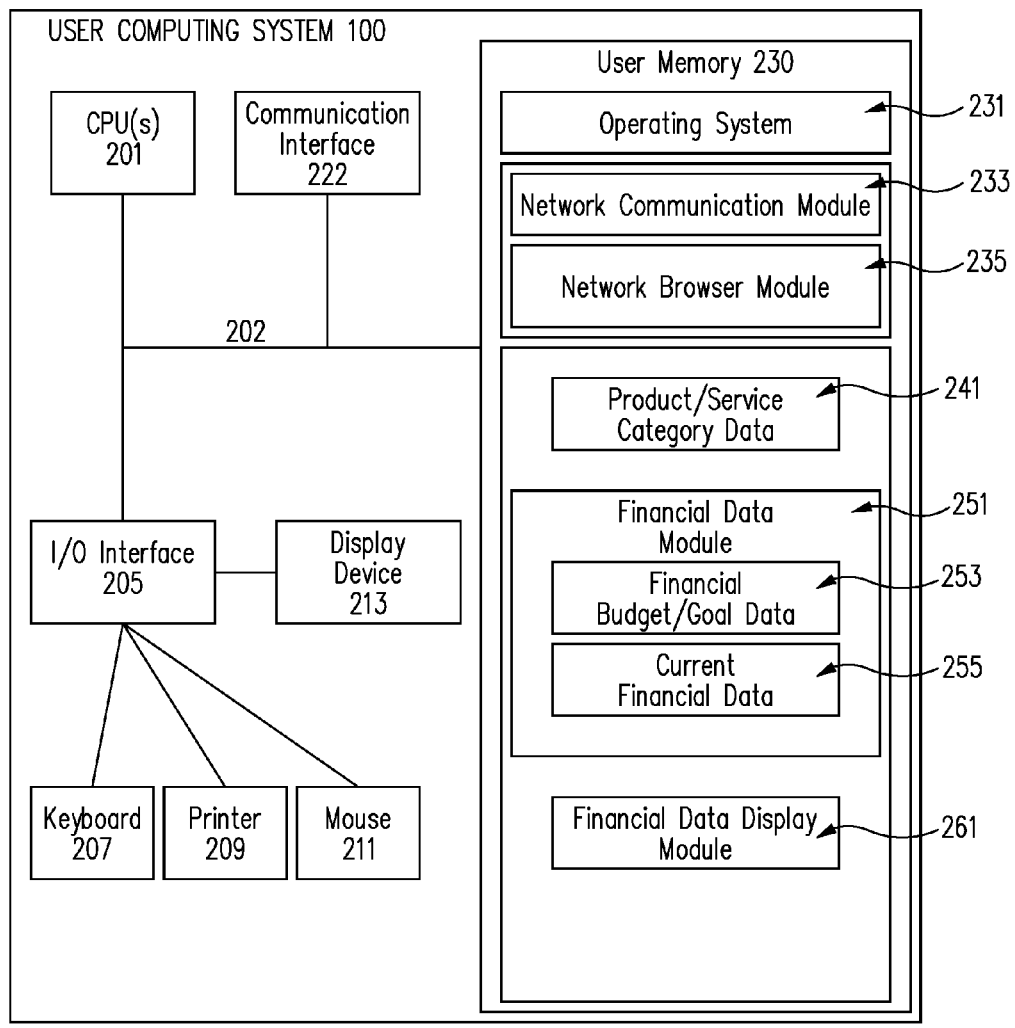
FIG. 2 is a block diagram of an exemplary user computing system of FIG. 1, in accordance with one embodiment.

FIG. 2 is a more detailed block diagram of an exemplary user computing system 100. As seen in FIG. 2, in one embodiment, user computing system 100 includes one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3) and/or 401 (FIG. 4): operating system 231 that includes procedures, data, and/or instructions for handling various services and performing/coordinating hardware dependent tasks; network communications module 233 that includes procedures, data, and/or instructions, for, along with communication interface 222, connecting user computing system 100 to other computing systems, such as other user computing system 100 and/or computing system 150 of FIG. 1, and/or computing system 160 of FIG. 1, and/or a network, such as network 130 of FIG. 1, and/or a database, such as database 170 of FIG. 1; network browser module 235 that includes procedures, data, and/or instructions, for, along with communication interface 222, providing user computing system 100, and/or a given user access to a network, such as the Internet; product/service category data 241 that includes procedures, data, and/or instructions, associated with obtaining and storing data associating one or more products and/or services with one or more financial categories; financial data module 251 includes procedures, data, and/or instructions, associated with obtaining and storing financial data associated with a given user of user computing system 100; and financial data display module 261 that includes procedures, data, and/or instructions, for displaying hypothetical remaining balance data for one or more financial categories associated with a given product and/or service for a given period of time.

As also seen in FIG. 2, in one embodiment, financial data module 251 includes financial budget/goal data 253 and current financial data 255. In one embodiment, financial budget/goal data 253 that includes data indicating a given user's budgetary and/or financial goals for one or more financial categories. In one embodiment, current financial data 255 includes data indicating a given user's current financial data regarding the given user's actual spending in one or more financial categories.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system 100 and user memory 230 is provided below with respect to FIG. 5.

Figure 3:
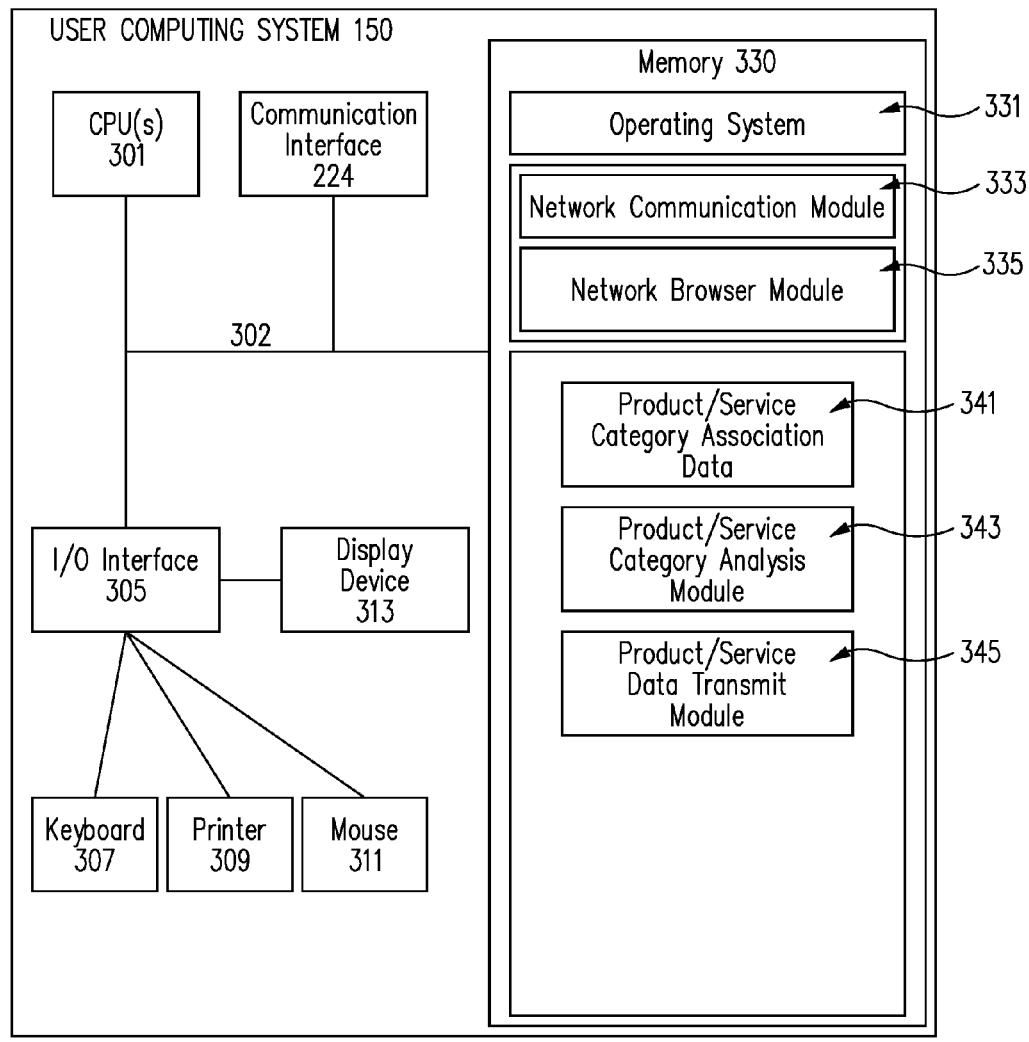
FIG. 3 is a block diagram of an exemplary computing system of FIG. 1, in accordance with one embodiment.

FIG. 3 is a more detailed block diagram of an exemplary computing system 150. As seen in FIG. 3, in one embodiment, computing system 150 includes one or more Central Processing Unit(s), CPU(s) 301; computing system memory system 330; at least one communication interface 224; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, computing system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3) and/or 401 (FIG. 4): operating system 331 that includes procedures, data, and/or instructions for handling various services and performing/coordinating hardware dependent tasks; network communications module 333 that includes procedures, data, and/or instructions, for, along with communication interface 322, connecting computing system 150 to other computing systems, such as user computing system(s) 100, computing system 160, and/or another computing system, and/or a network, such as network 130 of FIG. 1, and/or a database, such as database 170 of FIG. 1; network browser module 335 that includes procedures, data, and/or instructions, for, along with communication interface 222, providing computing system 150, and/or a given user access to a network, such as the Internet; product/service category association module 341 that includes procedures, data, and/or instructions for obtaining and/or storing data associating one or more products and/or services with one or more financial categories; product/service category analysis module 343 that includes procedures, data, and/or instructions for identifying one or more specific financial categories associated with a given product and/or service identified; product/service category data transmit module 345 that that includes procedures, data, and/or instructions for transmitting data associating one or more products and/or services with one or more financial categories from browser data module 335 to another computing system, such as user computing system 100 and/or product/service category data 241.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary computing system 150 and computing system memory system 330 is provided below with respect to FIG. 5.

Figure 4:
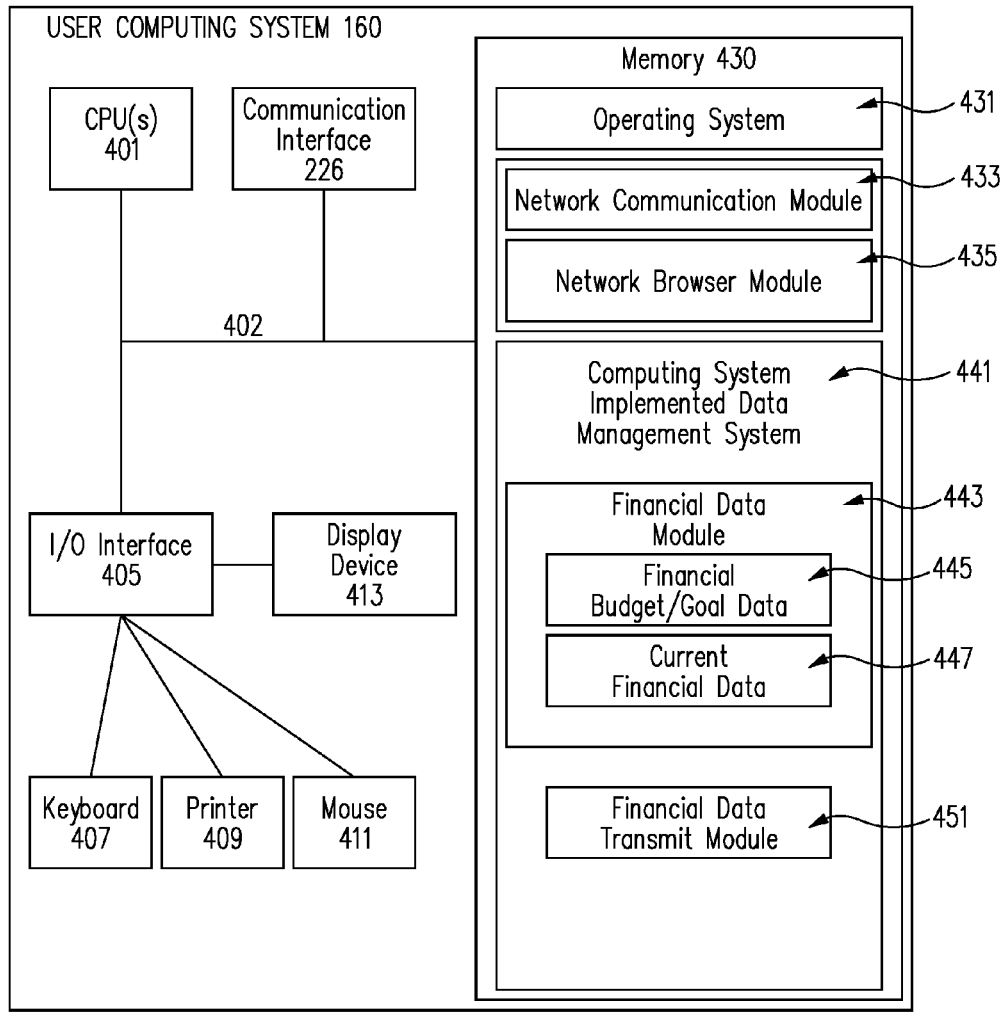
FIG. 4 is a block diagram of an exemplary computing system of FIG. 1, in accordance with one embodiment.

FIG. 4 is a more detailed block diagram of an exemplary computing system 160. As seen in FIG. 4, in one embodiment, computing system 160 includes one or more Central Processing Unit(s), CPU(s) 401; computing system memory system 430; at least one communication interface 226; an Input/Output interface, I/O interface 405, including one or more user interface devices such as display device 413, keyboard 407, printer 409, and/or mouse 411; all interconnected by one or more communication buses 402.

As also seen in FIG. 4, in one embodiment, computing system memory system 430 can store data and/or instructions associated with, but not limited to, the following elements, subsets of elements, and/or super sets of elements for use in processing by one or more processors, such as CPU(s) 201 (FIG. 2) and/or 301 (FIG. 3) and/or 401 (FIG. 4): operating system 431 that includes procedures, data, and/or instructions for handling various services and performing/coordinating hardware dependent tasks; network communications module 433 that includes procedures, data, and/or instructions, for, along with communication interface 422, connecting computing system 160 to other computing systems, such as user computing system(s) 100, computing system 150, and/or another computing system, and/or a network, such as network 130 of FIG. 1, and/or a database, such as database 170 of FIG. 1; network browser module 435 that includes procedures, data, and/or instructions, for, along with communication interface 222, providing computing system 160, and/or a given user access to a network, such as the Internet; computing system implemented data management module 441 that includes procedures, data, and/or instructions associated with one or more computing system implemented data management systems, such as, but not limited to, a computing system implemented personal financial management system or any computing system implemented data management system, as discussed herein, and/or as known in the art at the time of filing, and/or as developed after the time of filing; and financial data transmit module 451 that includes procedures, data, and/or instructions for transmitting financial data associated with a given user from computing system implemented data management module 441 to another computing system, such as user computing system 100 and/or financial data module 251.

As also seen in FIG. 4, computing system implemented data management module 441 includes financial budget/goal data 443 that includes procedures, data, and/or instructions for obtaining and/or storing financial budget/goal data indicating the given user's one or more budgetary and/or financial goals for one or more financial categories associated with a given product and/or service for a given period of time; and current financial data 447 that includes procedures, data, and/ or instructions for obtaining and/or storing current financial data indicating a given user's actual spending in financial categories associated with a given product and/or service for a given period of time.

Those of skill in the art will readily recognize that the choice of components, data, modules, and information shown in FIG. 4, the organization of the components, data, modules, and information shown in FIG. 4, and the manner of storage and location of storage of the data, modules, and information shown in FIG. 4 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 4 are illustrative only and not limiting. In various other embodiments, the particular modules and/or data shown in FIG. 4 can be grouped together in fewer modules and/or data locations or divided among more modules and/or data locations. Consequently, those of skill in the art will recognize that other orders and/or grouping are possible and the particular modules and/or data, order, and/or grouping shown in FIG. 4 discussed herein do not limit the scope as claimed below.

A more detailed discussion of the operation of exemplary computing system 160 and computing system memory system 430 is provided below with respect to FIG. 5.

Process

Herein, the terms "given user" and/or "user", include any person, party, business, system, application, organization, and/or entity interacting with, interfacing with, contacting, viewing, providing data to, accepting data from, requesting data from, and/or otherwise associating with the process for displaying to a user the effect of a hypothetical purchase on the user's budgetary goals for any purpose. In addition, herein, the terms "individual" and/or "user" can be used interchangeably to denote any party using a process for displaying to a user the effect of a hypothetical purchase on the user's budgetary goals, and/or a person who is the subject of, source of, and/or target of, all, or part of, any data/information obtained and/or analysis performed by a process for displaying to a user the effect of a hypothetical purchase on the user's budgetary goals, and/or a legal guardian of a person who is the subject of, and/or target of, any data/information obtained and/or analysis performed by a process for displaying to a user the effect of a hypothetical purchase on the user's budgetary goals, and/or an authorized agent of any party using a process for displaying to a user the effect of a hypothetical purchase on the user's budgetary goals, and/or a person who is the subject of, and/or target of, any information obtained and/or analysis performed, by a process for displaying to a user the effect of a hypothetical purchase on the user's budgetary goals, and/or any other authorized party associated with any party using a process for displaying to a user the effect of a hypothetical purchase on the user's budgetary goals, and/or a person who is the subject of, and/or target of, any information obtained and/or analysis performed by a process for displaying to a user the effect of a hypothetical purchase on the user's budgetary goals.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for displaying to a user the effect of a hypothetical purchase on the user's budgetary goals includes a process for displaying to a user the effect of a hypothetical purchase on the user's budgetary goals whereby, in one embodiment, a given user defines one or more budgetary and/or financial goals for one or more financial categories for a given period of time. In one embodiment, a product/service category database is created that associates one or more products and/or services with one or more financial categories. In one embodiment, when a user is contemplating the purchase of a given product and/or service, data indicating the given product and/or service being considered for purchase, and/or the cost of the given product and/or service being considered for purchase, is obtained via one or more means as discussed herein, and/or as known in the art at the time of filing, and/or as developed after the time of filing. In one embodiment, once the given product and/or service being considered, and/or the cost of the given product and/or service being considered, is identified, the product/service category database is searched to find a financial category associated with the given product and/or service. In one embodiment, the financial budget/goal data indicating the given user's budgetary and/or financial goals for the financial category associated with the given product and/or service for the given period of time is then obtained. In one embodiment, current financial data indicating the given user's actual spending in the financial category associated with the given product and/or service for the given period of time is also obtained. In one embodiment, the financial budget/goal data indicating the given user's budgetary and/or financial goals for the financial category associated with the given product and/or service for the given period of time, the current financial data indicating the given user's actual spending in the financial category associated with the given product and/or service for the given period of time, and the data indicating the cost of the given product and/or service being considered for purchase is analyzed/compared. In one embodiment, the user is then presented data indicating the hypothetical remaining balance for the financial category associated with the product and/or service for the given period of time that would result if the given product and/or service were actually purchased. In one embodiment, the hypothetical remaining balance data for the financial category associated with the product and/or service for the given period of time is displayed to the user, at least in part, as a visual/graphical display.

Figure 5:
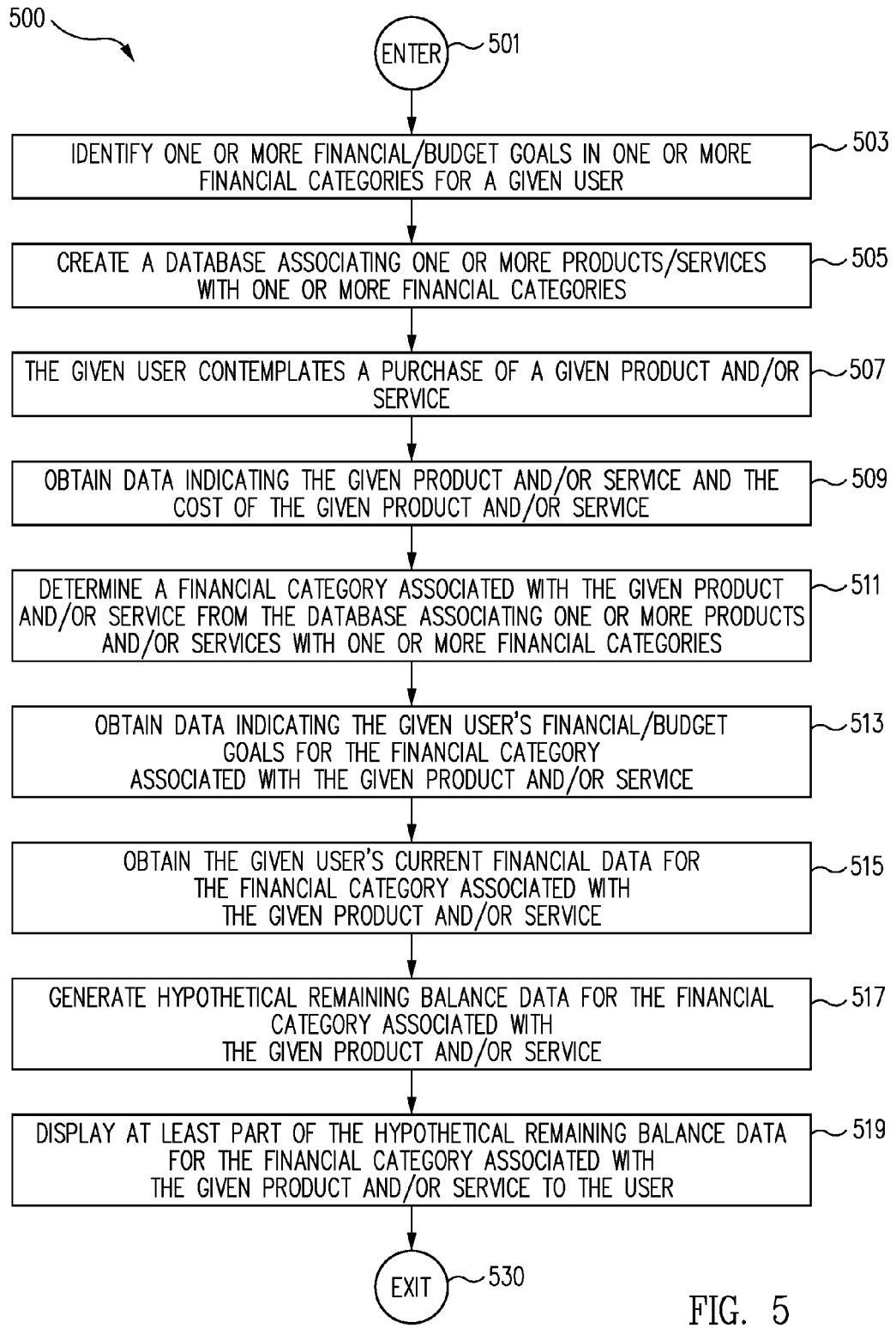
FIG. 5 is a flow chart depicting a process for displaying to a user the effect of a hypothetical purchase on the user's budgetary goals in accordance with one embodiment.

FIG. 5 is a flow chart depicting a process for displaying to a user the effect of a hypothetical purchase on the user's budgetary goals 500 in accordance with one embodiment. Process for displaying to a user the effect of a hypothetical purchase on the user's budgetary goals begins at ENTER OPERATION 501 of FIG. 5 and process flow proceeds to IDENTIFY ONE OR MORE FINANCIAL/BUDGET GOALS IN ONE OR MORE FINANCIAL CATEGORIES FOR A GIVEN USER OPERATION 503.

In one embodiment, at IDENTIFY ONE OR MORE FINANCIAL/BUDGET GOALS IN ONE OR MORE FINANCIAL CATEGORIES FOR A GIVEN USER OPERATION 503 a given user defines one or more budgetary and/or financial goals for one or more financial categories for a given period of time.

Herein, the term financial category includes any grouping of financial activities defined by one or more users, and/or one or more computing system implemented data management systems, and/or process for displaying to a user the effect of a hypothetical purchase on the user's budgetary goals 500. As an example, the term financial category can include, but is not limited to: rent/mortgage; entertainment; dinning out; food; groceries; car/transportation; clothing; school supplies/tuition; business; personal; savings; goal oriented savings; discretionary funds; vacation; and/or any other grouping of financial activities and/or financial activities as discussed herein, and/or as known in the art at the time of filing, and/or as developed after the time of filing.

In one embodiment, the given period of time of IDENTIFY ONE OR MORE FINANCIAL/BUDGET GOALS IN ONE OR MORE FINANCIAL CATEGORIES FOR A GIVEN USER OPERATION 503 is any period of time defined/desired by the given user and/or a provider of process for displaying to a user the effect of a hypothetical purchase on the user's budgetary goals 500, such as, but not limited to: a week, two weeks, a month, a quarter, a year, etc.

In one embodiment, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for a given period of time using and/or through a computing system implemented data management system such as, but not limited to, a computing system implemented personal financial management system.

In one embodiment, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for the given period of time using and/or through a computing system implemented data management system, such as a computing system implemented personal financial management system, implemented on a computing system, such as user computing system 100 of FIGS. 1 and 2 and/or computing systems 150 and/or 160 of FIG.s 1, 3 and 4. In one embodiment, the computing system implemented data management system is a computing system implemented data management system such as computing system implemented data management system 441 of FIG. 4.

As noted above, herein, a "computing system implemented financial management system" can be, but is not limited to, any data management system implemented on a computing system and/or accessed through a network that gathers financial data, including financial transactional data and/or has the capability to analyze and categorize at least part of the financial data. As used herein, the term computing system implemented financial management system includes, but is not limited to: computing system implemented personal and/or business financial management systems, packages, programs, modules, or applications; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filing or as developed later.

Specific examples of computing system implemented financial management systems include, but are not limited to: Quicken™, available from Intuit Inc. of Mountain View, Calif.; Quicken Online', available from Intuit Inc. of Mountain View, Calif.; Quickbooks™, available from Intuit Inc. of Mountain View, Calif.; Quicken Health Expense Manager™, available from Intuit Inc. of Mountain View, Calif.; Microsoft Money™, available from Microsoft, Inc. of Redmond, Wash.; Mint.com™, available from Intuit Inc. of Mountain View, Calif.; and/or various other computing system implemented financial management systems discussed herein, and/or known to those of skill in the art at the time of filing, and/or as developed after the time of filing.

Current computing system implemented financial management systems are typically software applications or online services which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using data entry, links to databases, aggregation scripting technology, and/or electronic data transfer systems such as the Open Financial Exchange (OFX) specification or various other systems for transferring and/or obtaining financial transaction data.

Using computing system implemented financial management systems, the financial transaction information, payee identification, payee location, payment amount, date of the transaction, various tags and/or labels, and other data is used by the computing system implemented financial management system to categorize and/or tag individual financial transactions as a particular type of income or expense, to generate various financial reports, and to create an overview of the user's financial situation based on input from multiple, and often all, available sources of financial information regarding a user. Some currently offered computing system implemented financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports. In addition, some currently offered computing system implemented financial management systems provide for user input to establish various financial goals such as categorized budgets and savings plans.

In various embodiments, at IDENTIFY ONE OR MORE FINANCIAL/BUDGET GOALS IN ONE OR MORE FINANCIAL CATEGORIES FOR A GIVEN USER OPERATION 503 the given user defines one or more budgetary and/or financial goals for one or more financial categories for a given period of time through, and/or the computing system implemented data management system is implemented on, one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, at IDENTIFY ONE OR MORE FINANCIAL/BUDGET GOALS IN ONE OR MORE FINANCIAL CATEGORIES FOR A GIVEN USER OPERATION 503 financial budget/goal data indicating the given user's one or more budgetary and/or financial goals for the one or more financial categories for the given period of time is associated with the given user, and the respective financial categories, and is then stored in whole, or in part, in any memory and/or database maintained by, accessible by, owned by, or otherwise related to, but not limited to, one or more of the following: a provider of the process for displaying to a user the effect of a hypothetical purchase on the user's budgetary goals; a provider of a computing system implemented data management system; one or more users; or any third party by any one of the numerous mechanisms known to those of skill in the art.

For instance, in various embodiments, the data, in whole, or in part, is stored in a memory system, such as memory systems 230, 330 and 430 of FIG.s 2, 3, and 4, or server memory system, or database, such as database 170 of FIG. 1, or in a cache memory, or in any main memory or mass memory, associated with a user computing system, such as user computing system 100 of FIGS. 1 and 2, and/or another computing system, such as computing systems 150 and 160 of FIG.s 1, 3, and 4, and/or a dedicated database, such as database 170 of FIG. 1. In one embodiment, the data, in whole, or in part, is stored in any computing system and/or server system, or other device, in another, remote, location, or on/in a computer readable medium, and/or any other computer program product, as defined herein. In one embodiment, the data, in whole, or in part, is stored on a webpage, in a web-based system or on a public network such as the Internet.

Returning to FIG. 5, in one embodiment, once a given user defines one or more budgetary and/or financial goals for one or more financial categories for a given period of time at IDENTIFY ONE OR MORE FINANCIAL/BUDGET GOALS IN ONE OR MORE FINANCIAL CATEGORIES FOR A GIVEN USER OPERATION 503, process flow proceeds to CREATE A DATABASE ASSOCIATING ONE OR MORE PRODUCTS/SERVICES WITH ONE OR MORE FINANCIAL CATEGORIES OPERATION 505.

In one embodiment, at CREATE A DATABASE ASSOCIATING ONE OR MORE PRODUCTS/SERVICES WITH ONE OR MORE FINANCIAL CATEGORIES OPERATION 505 a product/service category database is created that associates one or more products and/or services with one or more financial categories.

In one embodiment, at CREATE A DATABASE ASSOCIATING ONE OR MORE PRODUCTS/SERVICES WITH ONE OR MORE FINANCIAL CATEGORIES OPERATION 505 the product/service category database that associates one or more products and/or services with one or more financial categories is implemented on, and/or created using, one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data from the one or more providers of products and/or services.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using screen scraping technology and/or data mining techniques.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data provided by one or more users.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data provided by one or more computing system implemented data management systems.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data provided by one or more computing system implemented data management systems and/or one or more user's historical categorizations of transactions involving the one or more products and/or services.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data provided by one or more computing system implemented data management systems and/or the given user's historical categorizations of transactions involving the one or more products and/or services to create a product/service category database customized to the given user.

In one embodiment, at CREATE A DATABASE ASSOCIATING ONE OR MORE PRODUCTS/SERVICES WITH ONE OR MORE FINANCIAL CATEGORIES OPERATION 505 the product/service category database is created, at least in part, using data from any source of data that associates one or more products and/or services with one or more financial categories as discussed herein, and/or as known in the art at the time of filing, and/or as developed after the time of filing.

In one embodiment, once a product/service category database is created that associates one or more products and/or services with one or more financial categories at CREATE A DATABASE ASSOCIATING ONE OR MORE PRODUCTS/SERVICES WITH ONE OR MORE FINANCIAL CATEGORIES OPERATION 505, process flow proceeds to THE GIVEN USER CONTEMPLATES A PURCHASE OF A GIVEN PRODUCT AND/OR SERVICE OPERATION 507.

In one embodiment, at THE GIVEN USER CONTEMPLATES A PURCHASE OF A GIVEN PRODUCT AND/OR SERVICE OPERATION 507 the given user contemplates a hypothetical purchase of a given product and/or service.

In one embodiment, at THE GIVEN USER CONTEMPLATES A PURCHASE OF A GIVEN PRODUCT AND/OR SERVICE OPERATION 507 the given user contemplates a hypothetical purchase of the given product and/or service and, while the user contemplates a hypothetical purchase of the given product and/or service, process for displaying to a user the effect of a hypothetical purchase on the user's budgetary goals 500 is manually activated by the user via an icon, or other graphical display and/or activation interface, on a user interface screen of any user computing system as discussed herein, and/or as known in the art at the time of filing, and/or as developed after the time of filing.

In one embodiment, at THE GIVEN USER CONTEMPLATES A PURCHASE OF A GIVEN PRODUCT AND/OR SERVICE OPERATION 507 the given user contemplates a hypothetical purchase of the given product and/or service and, while the user contemplates a hypothetical purchase of the given product and/or service, process for displaying to a user the effect of a hypothetical purchase on the user's budgetary goals 500 is manually activated by the user via an icon, or other graphical display and/or activation interface, displayed in a web-browser graphic and/or frame/header.

In one embodiment, at THE GIVEN USER CONTEMPLATES A PURCHASE OF A GIVEN PRODUCT AND/OR SERVICE OPERATION 507 the given user contemplates a hypothetical purchase of the given product and/or service and the user takes an action indicating the user is ready to purchase the given product and/or service such as, activating a webpage interface giving details about the given product and/or service, and/or the user taking action to create a list of items they intend to purchase, i.e. adding the given product and/or service to a shopping cart, check-out basket, or wish list. In one embodiment, when the user takes an action indicating the user is ready to purchase the given product and/or service, process for displaying to a user the effect of a hypothetical purchase on the user's budgetary goals 500 is activated; in one embodiment, automatically.

In one embodiment, at THE GIVEN USER CONTEMPLATES A PURCHASE OF A GIVEN PRODUCT AND/OR SERVICE OPERATION 507 the given user contemplates a hypothetical purchase of the given product and/or service and, while the user contemplates a hypothetical purchase of the given product and/or service, process for displaying to a user the effect of a hypothetical purchase on the user's budgetary goals 500 is automatically activated.

In one embodiment, at THE GIVEN USER CONTEMPLATES A PURCHASE OF A GIVEN PRODUCT AND/OR SERVICE OPERATION 507 the user contemplates a hypothetical purchase of the given product and/or service by accessing a given user interface of a website through which the given product and/or service is offered and/or displayed.

In one embodiment, the user accesses the given user interface of the website through which the given product and/or service is offered and/or displayed via any user computing system as discussed herein, and/or as known in the art at the time of filing, and/or as developed after the time of filing.

In one embodiment, at THE GIVEN USER CONTEMPLATES A PURCHASE OF A GIVEN PRODUCT AND/OR SERVICE OPERATION 507, the user accesses the given user interface of the website through which the given product and/or service is offered and/or displayed via one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In some embodiments, at THE GIVEN USER CONTEMPLATES A PURCHASE OF A GIVEN PRODUCT AND/OR SERVICE OPERATION 507 the user contemplates a hypothetical purchase of the given product and/or service at a physical point of sale.

In one embodiment, once the given user contemplates a hypothetical purchase of the given product and/or service and, while the user contemplates a hypothetical purchase of the given product and/or service, process for displaying to a user the effect of a hypothetical purchase on the user's budgetary goals 500 is activated at THE GIVEN USER CONTEMPLATES A PURCHASE OF A GIVEN PRODUCT AND/OR SERVICE OPERATION 507, process flow proceeds to OBTAIN DATA INDICATING THE GIVEN PRODUCT AND/OR SERVICE AND THE COST OF THE GIVEN PRODUCT AND/OR SERVICE OPERATION 509.

In one embodiment, at OBTAIN DATA INDICATING THE GIVEN PRODUCT AND/OR SERVICE AND THE COST OF THE GIVEN PRODUCT AND/OR SERVICE OPERATION 509 data indicating the given product and/or service being considered for purchase at THE GIVEN USER CONTEMPLATES A PURCHASE OF A GIVEN PRODUCT AND/OR SERVICE OPERATION 507, and/or the cost of the given product and/or service being considered for purchase at THE GIVEN USER CONTEMPLATES A PURCHASE OF A GIVEN PRODUCT AND/OR SERVICE OPERATION 507, is obtained via one or more means as discussed herein, and/or as known in the art at the time of filing, and/or as developed after the time of filing.

For instance, as noted above, in one embodiment, at THE GIVEN USER CONTEMPLATES A PURCHASE OF A GIVEN PRODUCT AND/OR SERVICE OPERATION 507 the user contemplates a hypothetical purchase of the given product and/or service by accessing a given user interface of a website through which the given product and/or service is offered and/or displayed. Then, in one embodiment, when the user accesses the given user interface of the website through which the given product and/or service is offered and/or displayed and process for displaying to a user the effect of a hypothetical purchase on the user's budgetary goals 500 is activated, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 using screen scraping, or a similar technology, as discussed herein, and/or as known in the art at the time of filing, and/or as developed after the time of filing.

As another example, as noted above, in one embodiment, at THE GIVEN USER CONTEMPLATES A PURCHASE OF A GIVEN PRODUCT AND/OR SERVICE OPERATION 507 the user contemplates a hypothetical purchase of the given product and/or service by accessing a given user interface of a website through which the given product and/or service is offered and/or displayed. Then, in one embodiment, when the user accesses the given user interface of the website through which the given product and/or service is offered and/or displayed, and process for displaying to a user the effect of a hypothetical purchase on the user's budgetary goals 500 is activated, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 using the URL data of the user interface of the website through which the given product and/or service is offered, or similar data and/or technology, as discussed herein, and/or as known in the art at the time of filing, and/or as developed after the time of filing.

As also noted above, in some embodiments, at THE GIVEN USER CONTEMPLATES A PURCHASE OF A GIVEN PRODUCT AND/OR SERVICE OPERATION 507 the user contemplates a hypothetical purchase of the given product and/or service at a physical point of sale.

In some embodiments, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 by scanning a bar code, or similar labeling system, associated with the given product and/or service the user is considering purchasing using any means and/or any computing system, as discussed herein, and/or as known in the art at the time of filing, and/or as developed after the time of filing.

In various embodiments, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 via RFID, or similar labeling system, associated with the given product and/or service the user is considering purchasing using any means and/or any computing system, as discussed herein, and/or as known in the art at the time of filing, and/or as developed after the time of filing.

In various embodiments, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 via manual data entry of a product name, a product number, serial number, part number, inventory number, or similar labeling system, and/or the purchase price, associated with the given product and/or service the user is considering purchasing using any means and/or any computing system, as discussed herein, and/or as known in the art at the time of filing, and/or as developed after the time of filing.

In various embodiments, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 via voice recognition software data entry of a product name, product number, serial number, part number, inventory number, or similar labeling system, and/or the purchase price, associated with the given product and/or service the user is considering purchasing using any means and/or any computing system, as discussed herein, and/or as known in the art at the time of filing, and/or as developed after the time of filing.

In various embodiments, at OBTAIN DATA INDICATING THE GIVEN PRODUCT AND/OR SERVICE AND THE COST OF THE GIVEN PRODUCT AND/OR SERVICE OPERATION 509 data indicating the given product and/or service the user is considering purchasing, and/or the cost of the given product and/or service the user is considering purchasing, is obtained by process for displaying to a user the effect of a hypothetical purchase on the user's budgetary goals 500 via any means, mechanism, process, and/or procedure for identifying a product and/or service and/or cost as discussed herein, and/or as known in the art at the time of filing, and/or as developed after the time of filing.

In one embodiment, at OBTAIN DATA INDICATING THE GIVEN PRODUCT AND/OR SERVICE AND THE COST OF THE GIVEN PRODUCT AND/OR SERVICE OPERATION 509 data indicating the cost of the given product and/or service the user is considering purchasing includes, but is not limited to, the purchase price of the given product and/or service, any tax associated with the purchase of the given product and/or service, any shipping and/or handling charges associated with the purchase of the given product and/or service, and/or any other charges associated with the given product and/or service.

In one embodiment, once the given user contemplates a hypothetical purchase of the given product and/or service and process for displaying to a user the effect of a hypothetical purchase on the user's budgetary goals 500 activated at THE GIVEN USER CONTEMPLATES A PURCHASE OF A GIVEN PRODUCT AND/OR SERVICE OPERATION 507, and data indicating the given product and/or service the user is considering purchasing, and/or the cost of the given product and/or service the user is considering purchasing, is obtained by process for displaying to a user the effect of a hypothetical purchase on the user's budgetary goals 500 at OBTAIN DATA INDICATING THE GIVEN PRODUCT AND/OR SERVICE AND THE COST OF THE GIVEN PRODUCT AND/OR SERVICE OPERATION 509, process flow proceeds to DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511.

In one embodiment, at DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 once the given product and/or service is identified at OBTAIN DATA INDICATING THE GIVEN PRODUCT AND/OR SERVICE AND THE COST OF THE GIVEN PRODUCT AND/OR SERVICE OPERATION 509, the product/service category database of CREATE A DATABASE ASSOCIATING ONE OR MORE PRODUCTS/SERVICES WITH ONE OR MORE FINANCIAL CATEGORIES OPERATION 505 is searched to find a financial category associated with the given product and/or service.

In one embodiment, at DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 the product/service category database of CREATE A DATABASE ASSOCIATING ONE OR MORE PRODUCTS/SERVICES WITH ONE OR MORE FINANCIAL CATEGORIES OPERATION 505 is searched to find a financial category associated with the given product and/or service using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, once the given product and/or service is identified at OBTAIN DATA INDICATING THE GIVEN PRODUCT AND/OR SERVICE AND THE COST OF THE GIVEN PRODUCT AND/OR SERVICE OPERATION 509 and the product/service category database of CREATE A DATABASE ASSOCIATING ONE OR MORE PRODUCTS/SERVICES WITH ONE OR MORE FINANCIAL CATEGORIES OPERATION 505 is searched to find a financial category associated with the given product and/or service at DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511, process flow proceeds to OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513.

In one embodiment, at OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513 the financial budget/goal data indicating the given user's budgetary and/or financial goals for the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503.

In one embodiment, at OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513 the financial budget/goal data indicating the given user's budgetary and/or financial goals for the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503 using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, once the financial budget/goal data indicating the given user's budgetary and/or financial goals for the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained from the stored data of IDENTIFY ONE OR MORE FINANCIAL/BUDGET GOALS IN ONE OR MORE FINANCIAL CATEGORIES FOR A GIVEN USER OPERATION 503 at OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513, process flow proceeds to OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 current financial data indicating the given user's actual spending in the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of current financial data indicating the given user's actual spending in the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained from a computing system implemented data management system such as a computing system implemented personal financial management system, such as computing system implemented data management system 441 of computing system 160 of FIG. 4.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of the current financial data indicating the given user's actual spending in the financial category associated with the given product and/or service for the given period of time is provided to, and/or entered into, and/or transferred to, and/or downloaded to, and/or otherwise obtained by, process for displaying to a user the effect of a hypothetical purchase on the user's budgetary goals 500 and/or a computing system implemented data management system associated with process for displaying to a user the effect of a hypothetical purchase on the user's budgetary goals 500 from the user, one or more banks, one or more credit card companies, a credit reporting agency or bureau, and/or any other financial institution or data source via any network or network system, such as network 130 of FIG. 1 and/or as discussed herein, and/or available or known at the time of filing, and/or as later developed.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of the current financial data indicating the given user's actual spending in the financial category associated with the given product and/or service for the given period of time is provided to, and/or entered into, and/or transferred to, and/or downloaded to, and/or otherwise obtained by, process for displaying to a user the effect of a hypothetical purchase on the user's budgetary goals 500, and/or a computing system implemented data management system associated with process for displaying to a user the effect of a hypothetical purchase on the user's budgetary goals 500, through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of the current financial data indicating the given user's actual spending in the financial category associated with the given product and/or service for the given period of time is provided to, and/or entered into, and/or transferred to, and/or downloaded to, and/or otherwise obtained by, process for displaying to a user the effect of a hypothetical purchase on the user's budgetary goals 500, and/or a computing system implemented data management system associated with process for displaying to a user the effect of a hypothetical purchase on the user's budgetary goals 500, from a database, such as database 170 of FIG. 1, maintained by the user, a bank, a credit card company, a credit reporting agency or bureau, and/or any other financial institution or data source, as discussed herein, and/or available or known at the time of filing, and/or as later developed.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of the current financial data indicating the given user's actual spending in the financial category associated with the given product and/or service for the given period of time is provided to, and/or entered into, and/or transferred to, and/or downloaded to, and/or otherwise obtained by, process for displaying to a user the effect of a hypothetical purchase on the user's budgetary goals 500, and/or a computing system implemented data management system associated with process for displaying to a user the effect of a hypothetical purchase on the user's budgetary goals 500, by embedding the data in, or on, a computer program product, as defined herein and providing the computer program product to the provider of computing system implemented financial management system associated with process for displaying to a user the effect of a hypothetical purchase on the user's budgetary goals 500 and/or process for displaying to a user the effect of a hypothetical purchase on the user's budgetary goals 500.

In one embodiment, at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515 at least part of the current financial data indicating the given user's actual spending in the financial category associated with the given product and/or service for the given period of time is provided to, and/or entered into, and/or transferred to, and/or downloaded to, and/or otherwise obtained by, process for displaying to a user the effect of a hypothetical purchase on the user's budgetary goals 500, and/or a computing system implemented data management system associated with process for displaying to a user the effect of a hypothetical purchase on the user's budgetary goals 500, by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once current financial data indicating the given user's actual spending in the financial category associated with the given product and/or service of DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 for the given period of time is obtained at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515, process flow proceeds to GENERATE HYPOTHETICAL REMAINING BALANCE DATA FOR THE FINANCIAL CATEGORY ASSOCIATED WITH THE GIVEN PRODUCT AND/OR SERVICE OPERATION 517.

In one embodiment, at GENERATE HYPOTHETICAL REMAINING BALANCE DATA FOR THE FINANCIAL CATEGORY ASSOCIATED WITH THE GIVEN PRODUCT AND/OR SERVICE OPERATION 517 the financial budget/goal data indicating the given user's budgetary and/or financial goals for the financial category associated with the given product and/or service for the given period of time of OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513, the current financial data indicating the given user's actual spending in the financial category associated with the given product and/or service for the given period of time of OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515, and the data indicating the cost of the given product and/or service the user is considering purchasing of OBTAIN DATA INDICATING THE GIVEN PRODUCT AND/OR SERVICE AND THE COST OF THE GIVEN PRODUCT AND/OR SERVICE OPERATION 509, is analyzed/compared and the results of the analysis, including a hypothetical remaining balance for the financial category associated with the given product and/or service for the given period of time if the purchase of the given product and/or service is executed, is generated.

In one embodiment, at GENERATE HYPOTHETICAL REMAINING BALANCE DATA FOR THE FINANCIAL CATEGORY ASSOCIATED WITH THE GIVEN PRODUCT AND/OR SERVICE OPERATION 517 the financial budget/goal data indicating the given user's budgetary and/or financial goals for the financial category associated with the given product and/or service for the given period of time, the current financial data indicating the given user's actual spending in the financial category associated with the given product and/or service for the given period of time, and the data indicating the cost of the given product and/or service the user is considering purchasing is analyzed/compared using, or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, at GENERATE HYPOTHETICAL REMAINING BALANCE DATA FOR THE FINANCIAL CATEGORY ASSOCIATED WITH THE GIVEN PRODUCT AND/OR SERVICE OPERATION 517 a hypothetical remaining balance in the financial category associated with the given product and/or service for the given period of time that would result if the given product and/or service were actually purchased is determined under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, once the financial budget/goal data indicating the given user's budgetary and/or financial goals for the financial category associated with the given product and/or service for the given period of time of OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513, the current financial data indicating the given user's actual spending in the financial category associated with the given product and/or service for the given period of time of OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515, and the data indicating the cost of the given product and/or service the user is considering purchasing of OBTAIN DATA INDICATING THE GIVEN PRODUCT AND/OR SERVICE AND THE COST OF THE GIVEN PRODUCT AND/OR SERVICE OPERATION 509, is analyzed/compared and the results of the analysis, including a hypothetical remaining balance for the financial category associated with the given product and/or service for the given period of time if the purchase of the given product and/or service is executed, is generated at GENERATE HYPOTHETICAL REMAINING BALANCE DATA FOR THE FINANCIAL CATEGORY ASSOCIATED WITH THE GIVEN PRODUCT AND/OR SERVICE OPERATION 517, process flow proceeds to DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519.

In one embodiment, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the given user is presented at least part of the data of GENERATE HYPOTHETICAL REMAINING BALANCE DATA FOR THE FINANCIAL CATEGORY ASSOCIATED WITH THE GIVEN PRODUCT AND/OR SERVICE OPERATION 517 indicating the hypothetical remaining balance for the financial category associated with the product and/or service for the given period of time that would result if the given product and/or service were actually purchased. In one embodiment, the hypothetical remaining balance data for the financial category associated with the product and/or service for the given period of time is displayed to the user, at least in part, as a visual/graphical display.

In one embodiment, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the user is presented data indicating the hypothetical remaining balance for the financial category associated with the product and/or service for the given period of time that would result if the given product and/or service were actually purchased using, and/or under the direction of, one or more processors associated with one or more of: the given user's computing system; a computing system associated with the provider of the process for displaying to a user the effect of a hypothetical purchase on the user's budgetary goals; a computing system associated with the provider of the computing system implemented data management system; and/or a computing system associated with a third party.

In one embodiment, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the user is presented data indicating the hypothetical remaining balance for the financial category associated with the product and/or service for the given period of time that would result if the given product and/or service were actually purchased on a display screen of a display device of any computing system, as defined herein, and/or as known in the art at the time of filing, and/or as developed after the time of filing.

In one embodiment, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the user is presented data indicating the hypothetical remaining balance for the financial category associated with the product and/or service for the given period of time that would result if the given product and/or service were actually purchased in the same display screen displaying the user interface of the website through which the given product and/or service is offered and/or displayed, and from which the process for displaying to a user the effect of a hypothetical purchase on the user's budgetary goals obtained the data indicating the given product and/or service the user is considering purchasing, and/or the cost of the given product and/or service the user is considering purchasing.

In one embodiment, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the hypothetical remaining balance data for the financial category associated with the product and/or service for the given period of time is displayed to the user, at least in part, as a visual/graphical display.

For instance, in various embodiments, at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 the hypothetical remaining balance data for the financial category associated with the product and/or service for the given period of time is displayed to the user in the form of any table, symbol, or graphical display. As an example, a table, a ledger, a thermometer, a sliding scale, any graphical representation, or any partially filled figure or symbol, or outline thereof, may be used. Moreover, these symbols, graphical displays, and scales may, in some embodiments, display the user's used funds, and/or unused funds, and/or the differential between the user's current spending and the identified financial goals.

Figure 6:
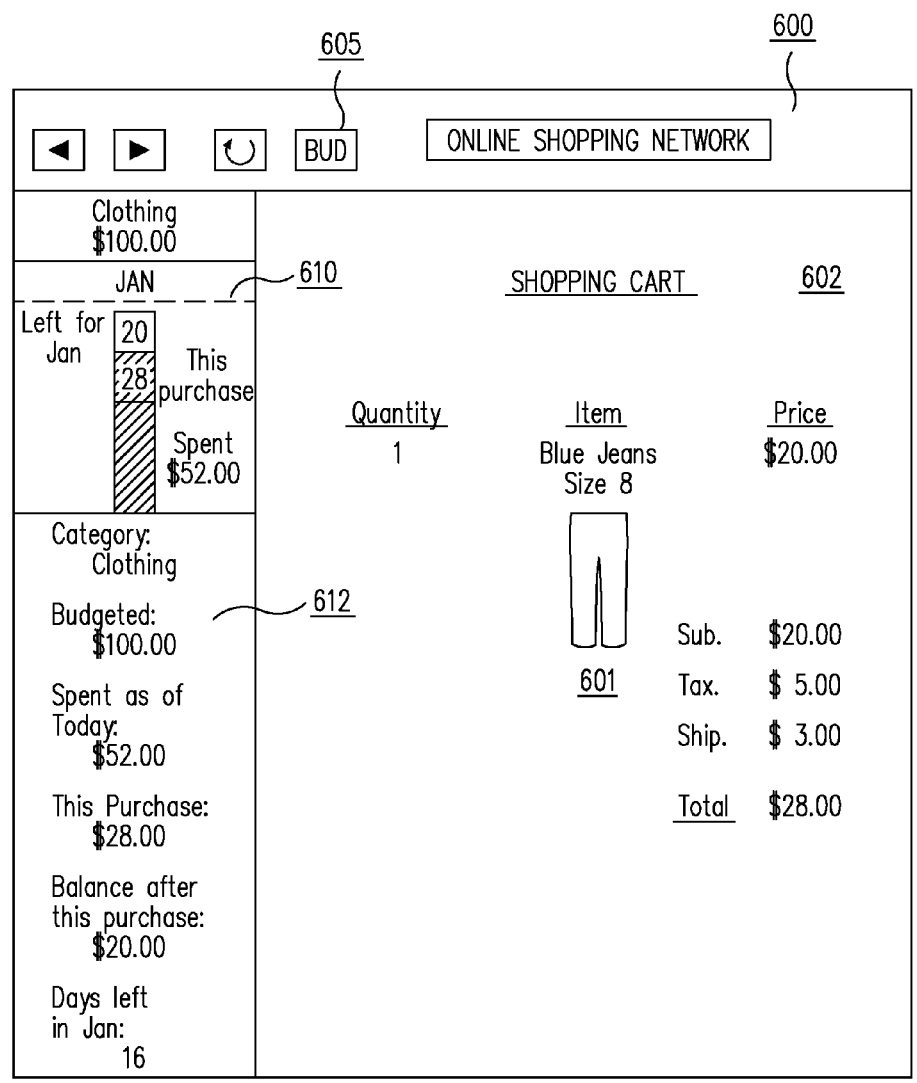
FIG. 6 is an exemplary user interface screen associated with a given product and/or service and including a hypothetical remaining balance data display in accordance with one embodiment.

FIG. 6 shows a is an exemplary user interface screen associated with a given product and/or service and including a hypothetical remaining balance data display in accordance with specific illustrative example of one embodiment.

Referring to FIGS. 5 and 6 together, in the specific illustrative example of FIG. 6, it is stipulated that the given user defines one or more budgetary and/or financial goals for one or more financial categories for a given period of time at IDENTIFY ONE OR MORE FINANCIAL/BUDGET GOALS IN ONE OR MORE FINANCIAL CATEGORIES FOR A GIVEN USER OPERATION 503 such that the financial category of clothing is allotted $100.00 for the month of January. In the specific illustrative example of FIG. 6, it is further stipulated that, in January, the given user has already spent $52.00 in the financial category of clothing.

In the specific illustrative example of FIG. 6, it is further stipulated that the a product/service category database is created at CREATE A DATABASE ASSOCIATING ONE OR MORE PRODUCTS/SERVICES WITH ONE OR MORE FINANCIAL CATEGORIES OPERATION 505 that associates "blue jeans" with the financial category of clothing.

In the specific illustrative example of FIG. 6, it is further stipulated that at THE GIVEN USER CONTEMPLATES A PURCHASE OF A GIVEN PRODUCT AND/OR SERVICE OPERATION 507 the given user accesses a website associated with the given merchant "ONLINE SHOPPING NETWORK" and the given user accesses an interface display 602 on a display screen 600 showing a pair of blue jeans 601 being considered for purchase at a purchase price of $20.00, with tax of $5.00, and shipping and handling charge of $3.00.

In the specific illustrative example of FIG. 6, using one embodiment of process for displaying to a user the effect of a hypothetical purchase on the user's budgetary goals 500, once process for displaying to a user the effect of a hypothetical purchase on the user's budgetary goals 500 is activated via activation icon 605, data indicating that the given product and/or service being considered for purchase is blue jeans is obtained at OBTAIN DATA INDICATING THE GIVEN PRODUCT AND/OR SERVICE AND THE COST OF THE GIVEN PRODUCT AND/OR SERVICE OPERATION 509, and the total cost of the blue jeans of $28.00 (purchase price of $20.00 plus the tax of $5.00 and the shipping and handling charge of $3.00) is also obtained OBTAIN DATA INDICATING THE GIVEN PRODUCT AND/OR SERVICE AND THE COST OF THE GIVEN PRODUCT AND/OR SERVICE OPERATION 509, in one example, using screen scraping of interface display 602 showing the pair of blue jeans 601.

In the specific illustrative example of FIG. 6, once the given product and/or service being considered for purchase is identified as blue jeans, the product/service category database is searched at DETERMINE A FINANCIAL CATEGORY ASSOCIATED WITH THE GIVEN PRODUCT AND/OR SERVICE FROM THE DATABASE ASSOCIATING ONE OR MORE PRODUCTS AND/OR SERVICES WITH ONE OR MORE FINANCIAL CATEGORIES OPERATION 511 to find the financial category of clothing that is associated with blue jeans.

In the specific illustrative example of FIG. 6, the financial budget/goal data indicating the given user's budgetary goal of $100.00 for the financial category of clothing for the given period of January is then obtained at OBTAIN DATA INDICATING THE GIVEN USER'S FINANCIAL/BUDGET GOALS FOR THE FINANCIAL CATEGORY ASSOCIATED WITH THE GIVEN PRODUCT AND/OR SERVICE OPERATION 513.

In the specific illustrative example of FIG. 6, the current financial data indicating the given user's actual spending in the financial category of clothing, specifically, data indicating the spending discussed above of $52.00 in the financial category of clothing, for January is obtained at OBTAIN THE GIVEN USER'S CURRENT FINANCIAL DATA FOR THE FINANCIAL CATEGORY ASSOCIATED WITH THE GIVEN PRODUCT AND/OR SERVICE OPERATION 515.

Then, in the specific illustrative example of FIG. 6, using one or more processors, at GENERATE HYPOTHETICAL REMAINING BALANCE DATA FOR THE FINANCIAL CATEGORY ASSOCIATED WITH THE GIVEN PRODUCT AND/OR SERVICE OPERATION 517 the $52.00 already spent in the category clothing in January is subtracted from the $100.00 budgeted and it is determined that $48.00 remains for January. Then, the $28.00 cost of the blue jeans is subtracted from the remaining $48.00 for January to yield a hypothetical remaining balance for the financial category of clothing of $20.00 for the remainder of January that would result if the blue jeans were actually purchased.

Continuing with the specific illustrative example of FIG. 6, the hypothetical remaining balance data for the financial category of clothing of $20.00 for the remainder of January is then displayed to the given user as a graphical element 610 and a text-based display 612. In this particular example, graphical element 610 and text-based display 612 are displayed in the same display screen 600 as the interface display 602 showing the pair of blue jeans 601 being considered for purchase, before the purchase is actually made.

As noted above, herein, the term financial category includes any grouping of financial activities defined by one or more users, and/or one or more computing system implemented data management systems, and/or a process for displaying to a user the effect of a hypothetical purchase on the user's budgetary goals. As an example, the term financial category can include, but is not limited to: rent/mortgage; entertainment; dinning out; food; groceries; car/transportation; clothing; school supplies/tuition; business; personal; savings; goal oriented savings; discretionary funds; vacation; and/or any other grouping of financial activities and/or financial activities as discussed herein, and/or as known in the art at the time of filing, and/or as developed after the time of filing. Consequently, in other embodiments, the financial category of graphical element 610 and text-based display 612 could be discretionary spending, or any one or more other categories desired, considered applicable, and/or defined.

In one embodiment, once the given user is presented at least part of the data of GENERATE HYPOTHETICAL REMAINING BALANCE DATA FOR THE FINANCIAL CATEGORY ASSOCIATED WITH THE GIVEN PRODUCT AND/OR SERVICE OPERATION 517 indicating the hypothetical remaining balance for the financial category associated with the product and/or service for the given period of time that would result if the given product and/or service were actually purchased at DISPLAY AT LEAST PART OF THE HYPOTHETICAL REMAINING BALANCE DATA FOR THE FINANCIAL CATEGORY ASSOCIATED WITH THE GIVEN PRODUCT AND/OR SERVICE TO THE USER OPERATION 519 process flow proceeds to EXIT OPERATION 530. In one embodiment, at EXIT OPERATION 530, process for displaying to a user the effect of a hypothetical purchase on the user's budgetary goals 500 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for displaying to a user the effect of a hypothetical purchase on the user's budgetary goals 500, a connection is established between a product and/or service currently being considered for purchase by a given user, financial categories associated with the product and/or service currently being considered for purchase by a given user, user budgets associated with those financial categories, and actual user spending in those financial categories for a defined period of time. Then, using one embodiment of process for displaying to a user the effect of a hypothetical purchase on the user's budgetary goals 500, these connections are leveraged to provide the user with a real-time display indicating to the given user what funds would remain in the financial category associated with the product and/or service currently being considered for purchase if the hypothetical purchase were actually completed. Consequently, using process for displaying to a user the effect of a hypothetical purchase on the user's budgetary goals 500, a given user can observe the effects of a hypothetical purchase on their relevant categorized budget at or before the time of purchase, i.e., in "real-time" to make better spending decisions based on the real-time information. In one embodiment, this information is made available to the user in response to a single user activation action, such as a single mouse click, or, in other embodiments, automatically. Therefore, using process for displaying to a user the effect of a hypothetical purchase on the user's budgetary goals 500, the given user is provided a simple and efficient mechanism to obtain the information necessary to stay within budget, achieve financial goals, avoid overdrafts, and generally monitor their financial position before making a purchase.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating", "determining", "generating", "obtaining", "identifying", "analyzing", "presenting", "storing", "saving", "displaying", "categorizing", "providing", "processing", "accessing", "monitoring" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and system for displaying to a user the effect of a hypothetical purchase on the user's budgetary goals, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for displaying to a user the effect of a hypothetical purchase on the user's budgetary goals comprising:
    a user defining one or more financial or budgetary goals associated with one or more financial categories for a defined period of time and entering data indicating the one or more financial or budgetary goals associated with one or more financial categories for the defined period of time into one or more computing systems;
    providing a product/service category database, the product/service category database for associating one or more financial categories with one or more products and services stored within the database;
    categorizing information regarding one or more products or services in the product/service category database as being associated with a particular financial category, the categorization being based on the user's historical categorizations of transactions involving the one or more products or services;
    receiving, at a point of sale for a seller, information from the user indicating that the user intends to purchase a specified product or service from a seller
    using one or more processors associated with one or more computing systems to obtain data indicating the product or service the user is contemplating purchasing;
    using one or more processors associated with one or more computing systems to obtain data indicating the cost of the product or service the user is contemplating purchasing;
    using one or more processors associated with one or more computing systems to search the product/service category database to determine a financial category associated with the product or service the user is contemplating purchasing;
    using one or more processors associated with one or more computing systems to access the data indicating the user's one or more financial or budgetary goals associated with one or more financial categories to obtain data indicating the user's financial or budgetary goals for the defined period of time for the financial category associated with the product or service the user is contemplating purchasing;
    using one or more processors associated with one or more computing systems to obtain current financial data associated with the user to determine the user's spending so far in the defined period of time for the financial category associated with the product or service the user is contemplating purchasing;
    using one or more processors associated with one or more computing systems to analyze the data indicating the user's one or more financial or budgetary goals for the financial category associated with the product or service the user is contemplating purchasing for the defined period of time, data indicating the user's spending so far in the defined period of time for the financial category associated with the product or service the user is contemplating purchasing, and the data indicating the cost of the product or service the user is contemplating purchasing to generate data indicating a hypothetical remaining balance for the financial category of the product or service the user is contemplating purchasing for the defined period of time that would remain if the user were to purchase the product or service; and
    using one or more processors associated with one or more computing systems to display the at least part of the data indicating the hypothetical remaining balance for the financial category of the product or service the user is contemplating purchasing the defined period of time that would remain if the user were to purchase the product or service on a display device of a computing system.

2. The computing system implemented process for displaying to a user the effect of a hypothetical purchase on the user's budgetary goals of claim 1, wherein;
    the user defines one or more financial or budgetary goals associated with one or more financial categories for a defined period of time through a computing system implemented data management system.

3. The computing system implemented process for displaying to a user the effect of a hypothetical purchase on the user's budgetary goals of claim 1, wherein;
    the product/service category database includes data associating one or more financial categories with one or more products and services obtained from one or more computing system implemented data management systems.

4. The computing system implemented process for displaying to a user the effect of a hypothetical purchase on the user's budgetary goals of claim 1, wherein;
    the product/service category database includes data associating one or more financial categories with one or more products and services obtained from historical categorizations of transactions involving the one or more products and services by one or more users.

5. The computing system implemented process for displaying to a user the effect of a hypothetical purchase on the user's budgetary goals of claim 1, wherein;
    the product/service category database includes data associating one or more financial categories with one or more products and services obtained from historically categorizations of transactions involving the one or more products and services by the user.

6. The computing system implemented process for displaying to a user the effect of a hypothetical purchase on the user's budgetary goals of claim 1, wherein;
the user contemplates a purchase of a product or service via a website displaying the product or service.

7. The computing system implemented process for displaying to a user the effect of a hypothetical purchase on the user's budgetary goals of claim 6, wherein;
the data indicating the product or service the user is contemplating purchasing and data indicating the cost of the product or service the user is contemplating purchasing is obtained using one or more processors associated with one or more computing systems via screen scraping technology applied to the website displaying the product or service.

8. The computing system implemented process for displaying to a user the effect of a hypothetical purchase on the user's budgetary goals of claim 1, wherein;
the data indicating the product or service the user is contemplating purchasing and data indicating the cost of the product or service the user is contemplating purchasing is obtained using one or more processors associated with one or more computing systems via an optical reader.

9. The computing system implemented process for displaying to a user the effect of a hypothetical purchase on the user's budgetary goals of claim 1, wherein;
the data indicating the product or service the user is contemplating purchasing and data indicating the cost of the product or service the user is contemplating purchasing is obtained using one or more processors associated with one or more computing systems via RFID.

10. The computing system implemented process for displaying to a user the effect of a hypothetical purchase on the user's budgetary goals of claim 1, wherein;
the data indicating the product or service the user is contemplating purchasing and data indicating the cost of the product or service the user is contemplating purchasing is obtained using one or more processors associated with one or more computing systems via voice recognition software.

11. The computing system implemented process for displaying to a user the effect of a hypothetical purchase on the user's budgetary goals of claim 1, wherein;
at least part of current financial data associated with the user used to determine the user's spending so far in the defined period of time for the financial category associated with the product or service the user is contemplating purchasing is obtained from a computing system implemented data management system.

12. The computing system implemented process for displaying to a user the effect of a hypothetical purchase on the user's budgetary goals of claim 1, wherein;
at least part of current financial data associated with the user used to determine the user's spending so far in the defined period of time for the financial category associated with the product or service the user is contemplating purchasing is obtained from a computing system implemented financial management system that categorizes the user's financial transactions into one or more financial categories.

13. The computing system implemented process for displaying to a user the effect of a hypothetical purchase on the user's budgetary goals of claim 1, wherein;
at least part of current financial data associated with the user used to determine the user's spending so far in the defined period of time for the financial category associated with the product or service the user is contemplating purchasing is obtained from one or more sources of current financial data associated with the user selected from the group of sources of current financial data associated with the user consisting of:
a bank;
a debit card account;
a credit union;
an investment account; or
a credit card account.

14. The computing system implemented process for displaying to a user the effect of a hypothetical purchase on the user's budgetary goals of claim 1, wherein;
at least part of the data indicating the hypothetical remaining balance for the financial category of the product or service the user is contemplating purchasing for the defined period of time that would remain if the user were to purchase the product or service is displayed to the user on a display device of a computing system in the form of a data display selected form the group of data displays consisting of:
a pop-up display;
a data table;
a graphical symbol;
a graphical display;
a ledger;
a thermometer;
a display integrated into a browser framework;
and
a sliding scale.

15. A system for displaying to a user the effect of a hypothetical purchase on the user's budgetary goals comprising:
a user computing system;
a product/service category database, the product/service category database for associating one or more financial categories with one or more products and services stored within the database;
one or more processors associated with one or more computing systems, the one or more processors associated with one or more computing systems implementing at least part of a process for displaying to a user the effect of a hypothetical purchase on the user's budgetary goals, the process for displaying to a user the effect of a hypothetical purchase on the user's budgetary goals including:
a user defining one or more financial or budgetary goals associated with one or more financial categories for a defined period of time and entering data indicating the one or more financial or budgetary goals associated with one or more financial categories for the defined period of time into the user computing system;
categorizing one or more products or services in the product/service category database as being associated with a particular financial category, the categorization being based on the user's historical categorizations of transactions involving the one or more products or services;
receiving, at a point of sale for a seller, information from the user indicating that the user intends to purchase a specified product or service from a seller;
using the one or more processors associated with the one or more computing systems to obtain data indicating the product or service the user is contemplating purchasing;
using the one or more processors associated with the one or more computing systems to obtain data indicating the cost of the product or service the user is contemplating purchasing;
using the one or more processors associated with the one or more computing systems to search the product/service category database to determine a financial category associated with the product or service the user is contemplating purchasing;

using the one or more processors associated with the one or more computing systems to access the data indicating the user's one or more financial or budgetary goals associated with one or more financial categories to obtain data indicating the user's financial or budgetary goals for the defined period of time for the financial category associated with the product or service the user is contemplating purchasing;

using the one or more processors associated with the one or more computing systems to obtain current financial data associated with the user to determine the user's spending so far in the defined period of time for the financial category associated with the product or service the user is contemplating purchasing;

using the one or more processors associated with the one or more computing systems to analyze the data indicating the user's one or more financial or budgetary goals for the financial category associated with the product or service the user is contemplating purchasing for the defined period of time, data indicating the user's spending so far in the defined period of time for the financial category associated with the product or service the user is contemplating purchasing, and the data indicating the cost of the product or service the user is contemplating purchasing to generate data indicating a hypothetical remaining balance for the financial category of the product or service the user is contemplating purchasing for the defined period of time that would remain if the user were to purchase the product or service; and using the one or more processors associated with the one or more computing systems to display the at least part of the data indicating the hypothetical remaining balance for the financial category of the product or service the user is contemplating purchasing for the defined period of time that would remain if the user were to purchase the product or service on a display device of the user computing system.

16. The system for displaying to a user the effect of a hypothetical purchase on the user's budgetary goals of claim 15, wherein;

the user defines one or more financial or budgetary goals associated with one or more financial categories for a defined period of time through a computing system implemented data management system.

17. The system for displaying to a user the effect of a hypothetical purchase on the user's budgetary goals of claim 15, wherein;

the product/service category database includes data associating one or more financial categories with one or more products and services obtained from one or more computing system implemented data management systems.

18. The system for displaying to a user the effect of a hypothetical purchase on the user's budgetary goals of claim 15, wherein;

the product/service category database includes data associating one or more financial categories with one or more products and services obtained from historical categorizations of transactions involving the one or more products and services by one or more users.

19. The system for displaying to a user the effect of a hypothetical purchase on the user's budgetary goals of claim 15, wherein;

the product/service category database includes data associating one or more financial categories with one or more products and services obtained from historically categorizations of transactions involving the one or more products and services by the user.

20. The system for displaying to a user the effect of a hypothetical purchase on the user's budgetary goals of claim 15, wherein;

the user contemplates a purchase of a product or service via a website displaying the product or service.

21. The system for displaying to a user the effect of a hypothetical purchase on the user's budgetary goals of claim 20, wherein;

the data indicating the product or service the user is contemplating purchasing and data indicating the cost of the product or service the user is contemplating purchasing is obtained using the one or more processors associated with the one or more computing systems via screen scraping technology applied to the website displaying the product or service.

22. The system for displaying to a user the effect of a hypothetical purchase on the user's budgetary goals of claim 15, wherein;

the data indicating the product or service the user is contemplating purchasing and data indicating the cost of the product or service the user is contemplating purchasing is obtained using the one or more processors associated with the one or more computing systems via an optical reader.

23. The system for displaying to a user the effect of a hypothetical purchase on the user's budgetary goals of claim 15, wherein;

the data indicating the product or service the user is contemplating purchasing and data indicating the cost of the product or service the user is contemplating purchasing is obtained using the one or more processors associated with the one or more computing systems via RFID.

24. The system for displaying to a user the effect of a hypothetical purchase on the user's budgetary goals of claim 15, wherein;

the data indicating the product or service the user is contemplating purchasing and data indicating the cost of the product or service the user is contemplating purchasing is obtained using the one or more processors associated with the one or more computing systems via voice recognition software.

25. The system for displaying to a user the effect of a hypothetical purchase on the user's budgetary goals of claim 15, wherein;

at least part of current financial data associated with the user used to determine the user's spending so far in the defined period of time for the financial category associated with the product or service the user is contemplating purchasing is obtained from a computing system implemented data management system.

26. The system for displaying to a user the effect of a hypothetical purchase on the user's budgetary goals of claim 15, wherein;

at least part of current financial data associated with the user used to determine the user's spending so far in the defined period of time for the financial category associated with the product or service the user is contemplating purchasing is obtained from a computing system implemented financial management system that categorizes the user's financial transactions into one or more financial categories.

27. The system for displaying to a user the effect of a hypothetical purchase on the user's budgetary goals of claim 15, wherein;

at least part of current financial data associated with the user used to determine the user's spending so far in the defined period of time for the financial category associated with the product or service the user is contemplating purchasing is obtained from one or more sources of current financial data associated with the user selected from the group of sources of current financial data associated with the user consisting of:

a bank;

a debit card account;

a credit union;

an investment account; or a credit card account.

28. The system for displaying to a user the effect of a hypothetical purchase on the user's budgetary goals of claim 15, wherein;

at least part of the data indicating the hypothetical remaining balance for the financial category of the product or service the user is contemplating purchasing for the defined period of time that would remain if the user were to purchase the product or service is displayed to the user on a display device of a computing system in the form of a data display selected form the group of data displays consisting of:

a pop-up display;

a data table;

a graphical symbol;

a graphical display;

a ledger;

a thermometer;

a display integrated into a browser framework; and a sliding scale.

29. A method for displaying to a user the effect of a hypothetical purchase on the user's budgetary goals comprising:

a user defining one or more financial or budgetary goals associated with one or more financial categories for a defined period of time and entering data indicating the one or more financial or budgetary goals associated with one or more financial categories for the defined period of time into one or more computing systems;

providing a product/service category database, the product/service category database for associating one or more financial categories with one or more products and services stored within the database;

categorizing one or more products or services in the product/service category database as being associated with a particular financial category, the categorization being based on the user's historical categorizations of transactions involving the one or more products or services;

receiving, at a point of sale for a seller, information from the user indicating that the user intends to purchase a specified product or service from a seller;

using one or more processors associated with one or more computing systems to obtain data indicating the product or service the user is contemplating purchasing;

using one or more processors associated with one or more computing systems to obtain data indicating the cost of the product or service the user is contemplating purchasing;

using one or more processors associated with one or more computing systems to search the product/service category database to determine a financial category associated with the product or service the user is contemplating purchasing;

using one or more processors associated with one or more computing systems to access the data indicating the user's one or more financial or budgetary goals associated with one or more financial categories to obtain data indicating the user's financial or budgetary goals for the defined period of time for the financial category associated with the product or service the user is contemplating purchasing;

using one or more processors associated with one or more computing systems to obtain current financial data associated with the user to determine the user's spending so far in the defined period of time for the financial category associated with the product or service the user is contemplating purchasing;

using one or more processors associated with one or more computing systems to analyze the data indicating the user's one or more financial or budgetary goals for the financial category associated with the product or service the user is contemplating purchasing for the defined period of time, data indicating the user's spending so far in the defined period of time for the financial category associated with the product or service the user is contemplating purchasing, and the data indicating the cost of the product or service the user is contemplating purchasing to generate data indicating a hypothetical remaining balance for the financial category of the product or service the user is contemplating purchasing for the defined period of time that would remain if the user were to purchase the product or service; and using one or more processors associated with one or more computing systems to display the at least part of the data indicating the hypothetical remaining balance for the financial category of the product or service the user is contemplating purchasing for the defined period of time that would remain if the user were to purchase the product or service on a display device of a computing system.

30. The method for displaying to a user the effect of a hypothetical purchase on the user's budgetary goals of claim 29, wherein;

the user defines one or more financial or budgetary goals associated with one or more financial categories for a defined period of time through a computing system implemented data management system.

31. The method for displaying to a user the effect of a hypothetical purchase on the user's budgetary goals of claim 29, wherein;

the product/service category database includes data associating one or more financial categories with one or more products and services obtained from one or more computing system implemented data management systems.

32. The method for displaying to a user the effect of a hypothetical purchase on the user's budgetary goals of claim 29, wherein;

the product/service category database includes data associating one or more financial categories with one or more products and services obtained from historical categorizations of transactions involving the one or more products and services by one or more users.

33. The method for displaying to a user the effect of a hypothetical purchase on the user's budgetary goals of claim 29, wherein;

the product/service category database includes data associating one or more financial categories with one or more products and services obtained from historically categorizations of transactions involving the one or more products and services by the user.

34. The method for displaying to a user the effect of a hypothetical purchase on the user's budgetary goals of claim 29, wherein;

the user contemplates a purchase of a product or service via a website displaying the product or service.

35. The method for displaying to a user the effect of a hypothetical purchase on the user's budgetary goals of claim 34, wherein;
the data indicating the product or service the user is contemplating purchasing and data indicating the cost of the product or service the user is contemplating purchasing is obtained using one or more processors associated with one or more computing systems via screen scraping technology applied to the website displaying the product or service.

36. The method for displaying to a user the effect of a hypothetical purchase on the user's budgetary goals of claim 29, wherein;
the data indicating the product or service the user is contemplating purchasing and data indicating the cost of the product or service the user is contemplating purchasing is obtained using one or more processors associated with one or more computing systems via an optical reader.

37. The method for displaying to a user the effect of a hypothetical purchase on the user's budgetary goals of claim 29, wherein;
the data indicating the product or service the user is contemplating purchasing and data indicating the cost of the product or service the user is contemplating purchasing is obtained using one or more processors associated with one or more computing systems via RFID.

38. The method for displaying to a user the effect of a hypothetical purchase on the user's budgetary goals of claim 29, wherein;
the data indicating the product or service the user is contemplating purchasing and data indicating the cost of the product or service the user is contemplating purchasing is obtained using one or more processors associated with one or more computing systems via voice recognition software.

39. The method for displaying to a user the effect of a hypothetical purchase on the user's budgetary goals of claim 29, wherein;
at least part of current financial data associated with the user used to determine the user's spending so far in the defined period of time for the financial category associated with the product or service the user is contemplating purchasing is obtained from a computing system implemented data management system.

40. The method for displaying to a user the effect of a hypothetical purchase on the user's budgetary goals of claim 29, wherein;
at least part of current financial data associated with the user used to determine the user's spending so far in the defined period of time for the financial category associated with the product or service the user is contemplating purchasing is obtained from a computing system implemented financial management system that categorizes the user's financial transactions into one or more financial categories.

* * * * *

UNITED STATES PATENT AND TRADEMARK OFFICE
CERTIFICATE OF CORRECTION

| | | |
|---|---|---|
| PATENT NO. | : 8,301,501 B1 | Page 1 of 1 |
| APPLICATION NO. | : 12/646845 | |
| DATED | : October 30, 2012 | |
| INVENTOR(S) | : Justin Glaeser et al. | |

It is certified that error appears in the above-identified patent and that said Letters Patent is hereby corrected as shown below:

In the Claims:

In Column 38, Line 34, Claim 1, after "purchasing" and before "the", insert --for--.

Signed and Sealed this
Tenth Day of June, 2014

Michelle K. Lee
*Deputy Director of the United States Patent and Trademark Office*